United States Patent [19]

Mohri et al.

[11] Patent Number: 6,075,110
[45] Date of Patent: *Jun. 13, 2000

[54] STAIN-PROOFING AGENT FOR PREVENTING ADHERENCE OF STAIN AND NON-AQUEOUS COMPOSITION FOR PAINTS CONTAINING SAID AGENT

[75] Inventors: Haruhiko Mohri; Susumu Wada; Akira Chida; Masaru Nagato; Keiko Kunimasa; Yoshiki Shimizu, all of Settsu, Japan

[73] Assignee: Daikin Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,400

[22] PCT Filed: Feb. 16, 1996

[86] PCT No.: PCT/JP96/00354

§ 371 Date: Aug. 18, 1997

§ 102(e) Date: Aug. 18, 1997

[87] PCT Pub. No.: WO96/26254

PCT Pub. Date: Aug. 29, 1996

[30] Foreign Application Priority Data

Feb. 20, 1995 [JP] Japan .................................... 7-031144
May 29, 1995 [JP] Japan .................................... 7-130300
Aug. 8, 1995 [JP] Japan .................................... 7-202626

[51] Int. Cl.[7] .................................................. C08G 77/08
[52] U.S. Cl. ....................... 528/14; 106/287.16; 523/400; 525/100; 525/102; 528/17; 528/18; 528/21; 528/23; 528/28; 528/29; 556/483
[58] Field of Search ................................. 528/29, 14, 21, 528/28, 23, 18, 17; 523/400; 525/100, 102; 106/287.1, 287.16, 287.28; 556/483

[56] References Cited

U.S. PATENT DOCUMENTS

| | | | |
|---|---|---|---|
| 3,394,162 | 7/1968 | Braun et al. | 260/448.8 |
| 3,491,134 | 1/1970 | Seil et al. | 260/448.8 |
| 3,492,328 | 1/1970 | Kotzsch et al. | 260/448.8 |
| 3,509,061 | 4/1970 | Zisman et al. | 134/40 |
| 3,957,683 | 5/1976 | Hittmair et al. | 252/428 |
| 5,169,915 | 12/1992 | Mohri et al. | 526/247 |
| 5,216,081 | 6/1993 | Mohri et al. | 525/199 |
| 5,635,572 | 6/1997 | Ohnishi et al. | 525/453 |
| 5,855,960 | 1/1999 | Ohnishi et al. | 427/337 |

FOREIGN PATENT DOCUMENTS

| | | |
|---|---|---|
| 2-22372 | 1/1990 | Japan . |
| 4-216875 | 8/1992 | Japan . |

*Primary Examiner*—Robert Dawson
*Assistant Examiner*—Jeffrey B. Robertson
*Attorney, Agent, or Firm*—Armstrong, Westerman, Hattori, McLeland, & Naughton

[57] ABSTRACT

A stain-proofing agent comprising a compound represented by the formula (1):

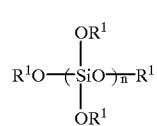

(1)

and non-aqueous composition for paints comprising the stain-proofing agent, resin, curing agent and/or curing catalyst and being capable of forming a coating film remarkably excellent in stain-proofing property.

5 Claims, No Drawings

STAIN-PROOFING AGENT FOR PREVENTING ADHERENCE OF STAIN AND NON-AQUEOUS COMPOSITION FOR PAINTS CONTAINING SAID AGENT

TECHNICAL FIELD

The present invention relates to a stain-proofing agent for preventing adherence of stains and a non-aqueous composition for paints containing the stain-proofing agent, and particularly relates to the non-aqueous composition suitable for paints for building materials, civil engineering, heavy duty coating, automobiles, etc.

BACKGROUND ART

In recent years, a solvent-soluble fluoroolefin copolymer containing hydroxyl group or carboxyl group has been used as an ultra-high weather resistive coating resin, and the use thereof has been increasing. It is known that copolymers of fluoroolefin with vinyl ether, vinyl ester or the like, which is proposed in, for example, JP-B-60-21686, JP-A-3-121107, JP-A-4-279612 and JP-A-4-28707, are soluble in usual solvent for paints, and in combination use with a curing agent such as isocyanate or melamine, can be baked or cured at normal temperature to form coating films excellent in weather resistance.

However, those coating films have a problem that, when the films are exposed outdoors, staining substances contained in air and in rain water are easily deposited on and adhere easily to a surface of the coating film (problem in stain-proofing property for preventing adherence of stains). In order to improve wipe-off property of carbon stains and marking ink (stain removal property), reaction products of fluoroolefin copolymer and silane compound were investigated in, for example, JP-A-4-173881. Also in U.S. Pat. No. 3,429,845 and JP-A-4-275379, there are proposed compositions of hydroxyl group-containing fluoroolefin copolymers and compounds (hydrolysis product) prepared by adding water and a catalyst (hydrochloric acid, etc.) to a silicate (monomer) or a silicate condensate (oligomer) and then hydrolyzing the mixture in alcohol. However, those compositions cannot offer the effect of improving the above-mentioned stain-proofing property.

Examples of employing a silane compound as a curing moiety as mentioned above are also proposed in JP-B-45-11309, JP-A-5-78612, JP-A-61-258852, JP-A-62-116673, JP-A-64-75575, JP-A-2-232221, JP-A-2-240153, JP-A-4-211482, JP-A-4-65476 and JP-A-4-292677. However, curing is insufficient due to large contents of alcohol and water. On the other hand, since a silicate originally has hydroxyl group or requires high temperature baking, migration of the silicate to the surface of coating film is inhibited. Also there is a problem that since the silane compound has a non-hydrolyzable group, hydrophilic property is insufficient. Due to the mentioned reasons, the stain-proofing property is not improved like the above-mentioned other proposals.

The situation is the same with respect to other paints of acryl, acrylic silicon, inorganic materials or the like, and a coating film having remarkably improved stain-proofing property is scarcely known.

Further as disclosed in WO94/06870, WO95/02645, JP-A-7-109435, JP-A-7-82520, JP-A-7-136583 and JP-A-7-136584, very recently techniques for improving stain-proofing property by adding an alkyl silicate to paints have come to be known, but the resulting coating films have disadvantages that hydrophilization of the coating film surface (stain-proofing property) cannot be repeatedly obtained, and that appearance and alkali resistance of the coating film are poor.

The present situation is such that though silane compounds are used as a dehydrating agent at the time of polymerizing or dispersing pigments, almost the whole amount of the silane compound reacts with water during the production process and thus, the effect of improving the stain-proofing property of the resulting coating film is scarcely obtained.

An object of the present invention is to provide a non-aqueous composition for paints being capable of forming a coating film which is remarkably excellent in stain-proofing property whereby neither staining substances contained in air nor stains due to rain water adhere to or are deposited on the coating film surface, and to provide a stain-proofing agent for adding to the composition.

DISCLOSURE OF THE INVENTION

The present invention relates to a stain-proofing agent comprising a compound represented by the formula (1):

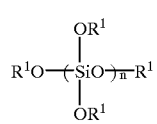

(1)

wherein n is an integer of 1 to 20, all of $R^1$ are different or at least two of $R^1$ are the same, each is a monovalent organic group having 1 to 1,000 carbon atoms and may contain oxygen atom, nitrogen atom and/or silicon atom, a part or the whole of hydrogen atoms of said organic group may be substituted by fluorine atom or fluorine atom and chlorine atom.

Further the present invention relates to a non-aqueous composition for paints comprising a stain-proofing agent comprising a compound represented by the formula (1):

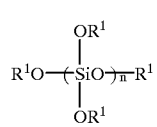

(1)

wherein n is an integer of 1 to 20, all of $R^1$ are different or at least two of $R^1$ are the same, each is a monovalent organic group having 1 to 1,000 carbon atoms and may contain oxygen atom, nitrogen atom and/or silicon atom, a part or the whole of hydrogen atoms of said organic group may be substituted by fluorine atom or fluorine atom and chlorine atom; a resin; and a curing agent and/or a curing catalyst.

BEST MODE FOR CARRYING OUT THE INVENTION

The stain-proofing agent of the present invention is added to paints for preventing staining substances contained in air and stains due to rain water, so-called rain-marking stains, from adhering to a coating film exposed outdoors (for example, coating films on cars, buildings, etc.). In addition thereto, the stain-proofing agent can be used for a resin surface modifier, antistatic agent, water absorption preventing agent or the like.

Though it is not clear why the above-mentioned effect can be obtained with the stain-proofing agent, it is presumed that, for example, the stain-proofing agent exists on the surface of a substrate or a product and is hydrolyzed by water in the air, thereby hydrophilizing the surface of the substrate or the product. In that state, even if staining substances together with rain water approach the surface, the rain water is attached to the surface more easily than the staining substances and the staining substances are scattered with the rain water, thus causing neither adherence nor deposition of the staining substances on the surface. As the stain-proofing agent has a surface-concentrating property, an efficient effect can be expected. It appears that such a function improves the mentioned effect, i.e., the stain-proofing effect, and even if contamination arises, stains are removed easily, i.e., the stain removal effect is improved.

The stain-proofing agent of the present invention may be a compound represented by the formula (1):

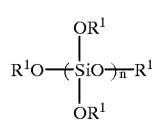

(1)

(hereinafter referred to as "compound I").

The industrially available compound I is actually a mixture of compounds having a certain range of n, and thus n is represented as an average value.

Also the compound I contains a condensate (oligomer) having a branched structure or cyclic structure in addition to a linear chain structure.

In the formula (1), n is an integer of 1 to 20, preferably 2 to 15, more preferably 4 to 10. When n decreases, a boiling point of the compound is lowered. Therefore, there is a tendency that when the compound is used for preparing a paint and the paint is applied by spray-coating, the compound is easy to vaporize and difficult to remain in a coating film. On the other hand, if n exceeds 20, when the compound is used for paints, there are defects that compatibility with, for example, a resin and curing agent is poor to lower storage stability, that appearance of a coating film is apt to be poor, that viscosity of the paint becomes high, and further that such a compound is difficult to obtain industrially.

It is preferable that the above-mentioned organic group has hydrolyzability and that after the hydrolysis, the organic group preferably has removable properties such as volatility, water solubility and thermal decomposition property.

All of $R^1$ are different or at least two of $R^1$ are the same, each is a monovalent organic group having 1 to 1,000 carbon atoms and may contain oxygen atom, nitrogen atom and/or silicon atom, a part or the whole of hydrogen atoms of said organic group may be substituted by fluorine atom or fluorine atom and chlorine atom.

It is preferable that the number of carbon atoms is from 1 to 100, more preferably from 1 to 16. When the number of carbon atoms decreases, there is a tendency that, for example, when the compound is used for preparing a paint and the paint is stored, storage stability is lowered. When the number of carbon atoms exceeds 1,000, there is a tendency that compatibility with a resin and hydrolyzability are lowered.

Any of the organic groups may be a substituent having a linear chain or a branched chain. When the substituent has fluorine atom, the branched substituent may be preferred from solubility point of view.

The organic group may contain oxygen atom, nitrogen atom and/or silicon atom. From the viewpoint of surface concentrating property, a group containing fluorine atom or a group containing silicon atom which has non-hydrolyzable group is preferred. A trifluoromethyl group-containing group and dimethylsiloxane chain-containing group are further preferred.

A part of hydrogen atoms of the organic group may be substituted by fluorine atom, which leads to a tendency of giving high surface concentrating property.

Also a part of hydrogen atoms of the organic group may be substituted by fluorine atom and chlorine atom, which leads to a tendency of giving high solubility.

As the organic group containing no fluorine atom of $R^1$, preferable is a hydrocarbon group having 1 to 8 carbon atoms, etc. Examples are, for instance, $CH_3$, $C_2H_5$, $CH_3CH_2CH_2$, $(CH_3)_2CH$, $CH_3(CH_2)_2CH_2$, $CH_3CH_2CH_2CH_2CH(C_2H_5)CH_2$, a dimethylsiloxane chain-containing group and the like. From the viewpoints of hydrolyzability, removable property, availability and workability, $CH_3$ and $C_2H_5$ are preferred and $CH_3$ is further preferred.

The organic group containing fluorine atom of $R^1$ may be a group having the surface concentrating property, and examples are those represented by, for instance, $F(CF_2)_n(CH_2)_m$, $(CF_3)_2CH$, $H(CF_2)_n(CH_2)_m$, $F(CF_2)_n(CH_2)_mC=O$, $H(CF_2)_n(CH_2)_mC=O$, $(F(CF_2)_n(CH_2)_m)_2N$, $((CF_3)_2CH)_2N$, $(H(CF_2)_n(CH_2)_m)_2N$, $F(CF_2)_nO(CF(CF_3)CF_2O)_mCF(CF_3)$ $C=O$, $(F(CF_2)_n(CH_2)_m)_2C=N$, $((CF_3)_2CH)_2C=N$, $(H(CF_2)_n(CH_2)_m)_2C=N$, $F(CF_2)_n(CH_2)_mC=ONR_3$, $H(CF_2)_n(CH_2)_mC=ONR_3$, $F(CF_2)_n(CH_2)_mC=CH_2$, $H(CF_2)_n(CH_2)_mC=CH_2$, $F(CF_2)_n(CH_2)_mC=CF_2$ and $H(CF_2)_n(CH_2)_mC=CF_2$, wherein m is 0 or an integer of 1 to 6, n is an integer of 1 to 10, $R^3$ represents an alkyl having 1 to 6 carbon atoms, the organic group containing fluorine atom may be a branched chain.

Examples of the fluorine-containing organic groups are, for instance, $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, $CF_3(CF_2)_7C=O$, and the like. From the viewpoints of surface concentrating property, hydrolyzability and removable property, $CF_3CH_2$, $CF_3CF_2CH_2$, $CF_3(CF_2)_2CH_2$, $CF_3(CF_2)_3CH_2CH_2$, $CF_3C=O$ and $CF_3CF_2C=O$ are preferred, and $CF_3CH_2$ and $CF_3CF_2CH_2$ are further preferred.

Examples of the compound I are, for instance,

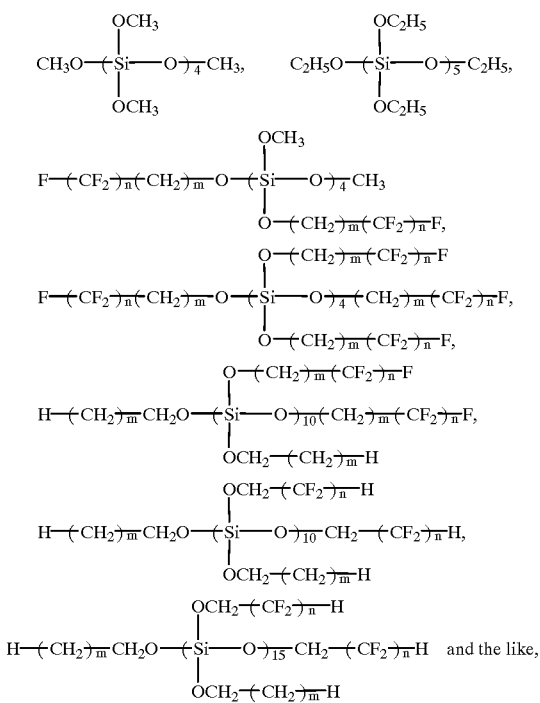

wherein m and n are the same as above. From the viewpoints of surface concentrating property, hydrolyzability, removable property and availability, preferable are:

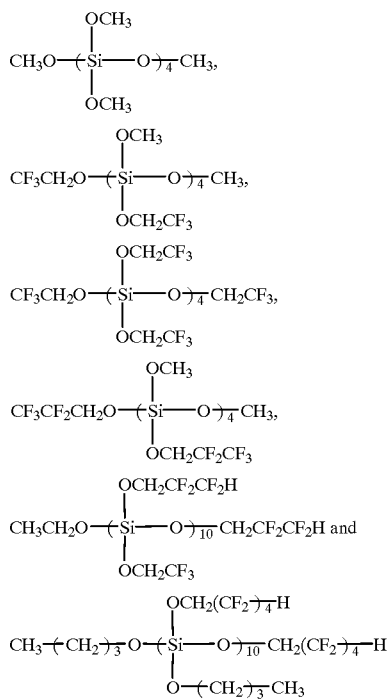

As a process for synthesizing such a fluorine-containing silicate or its oligomer as the compound I here is disclosed a process in which metallic sodium is used in, for example, U.S. Pat. No. 3,491,134, but there is difficulty in reaction procedures. Also a process disclosed in U.S. Pat. No. 2,777,870 has a problem that it is difficult to obtain starting materials.

In the present invention, there was found a process for synthesizing such a fluorine-containing silicate or its oligomer as the compound I without the problems as mentioned above, and thus the present invention has been completed.

The fluorine-containing silicate can be synthesized by allowing an alkyl silicate such as tetrachlorosilane, tetramethoxysilane or tetraethoxysilane to react with a fluorine-containing organic compound such as a fluorine-containing alcohol, a fluorine-containing carboxylic acid or a metal salt of fluorine-containing carboxylic acid.

The oligomer of the fluorine-containing silicate can be synthesized by allowing a chlorosiloxane compound such as hexachlorodisiloxane, octachlorotrisiloxane or decachlorotetrasiloxane, or an alkoxysiloxane compound such as an oligomer of tetramethoxysilane (for instance, Methyl Silicate 51 available from Colcoat Co., Ltd.) or an oligomer of tetraethoxysilane (for instance, Ethyl Silicate 40 available from Colcoat Co., Ltd.) to react with the above-mentioned fluorine-containing organic compound.

The oligomer of the fluorine-containing silicate can also be synthesized by further condensating, for example, a previously synthesized fluorine-containing silicate (monomer).

As a synthesis of an alkyl silicate containing no fluorine atom, there may be employed, for example, a process disclosed in JP-B-62-918. The process can also be applied to a synthesis of the fluorine-containing silicate.

The synthesis of the fluorine-containing silicate or its oligomer which is used in the present invention is then explained hereinbelow in detail.

As the first synthesis of the fluorine-containing silicate or its oligomer, there is, for example, a process in which a compound represented by the formula (9):

$$R_fOH \qquad (9)$$

wherein $R_f$ is a monovalent organic group having 1 to 1,000 carbon atoms and may contain oxygen atom, nitrogen atom and/or silicon atom, a part or the whole of hydrogen atoms of the organic group is substituted by fluorine atom or fluorine atom and chlorine atom, is allowed to react in the presence or absence of a catalyst, with a compound represented by the formula (10):

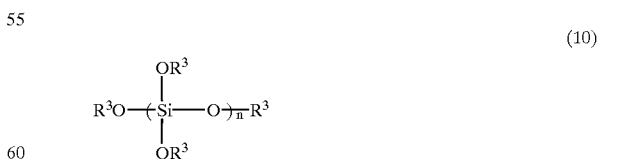

wherein n is an integer of 1 to 20, all of $R^3$ are different or at least two of $R^3$ are the same, each is a monovalent organic group having 1 to 1,000 carbon atoms, to prepare a fluorine-containing silicate or its oligomer represented by the formula (11):

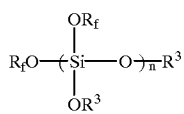
(11)

wherein n, $R^3$ and $R_f$ are the same as above, or represented by the formula (12):

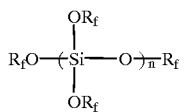
(12)

wherein n and $R_f$ are the same as above.

As the catalyst, it is preferable to use an acid, alkali, organometal compound or metal salt.

In the formula (9), the number of carbon atoms of $R_f$ is preferably from 1 to 100, more preferably from 1 to 16. When the number of carbon atoms decreases, since a difference in boiling point from $R^3OH$ which is substituted at the time of synthesis is small, there is a tendency that a substitution ratio is decreased to lower storage stability of the resulting paint. When the number of carbon atoms exceeds 1,000, there is a tendency that solubility of $R_fOH$ at the time of synthesis is lowered, and compatibility with a resin and hydrolyzability in the coating film are lowered.

Any of $R_f$ may be a linear or branched substituent. From the viewpoints of solubility at the time of synthesis and solubility at the time of preparing a paint, a branched substituent is preferable.

The $R_f$ may contain oxygen atom, nitrogen atom and/or silicon atom. When $R_f$ contains a silicon atom having non-hydrolyzable group, a dimethylsiloxane chain-containing group is preferred from the viewpoints of easiness of substitution with alcohol and surface concentrating property in application of paints.

When a part of hydrogen atoms of $R_f$ is substituted by fluorine atom, there is a tendency that viscosity of the paint becomes low and that the resulting paint is endowed with high surface concentrating property.

When a part of hydrogen atoms of $R_f$ is substituted by fluorine atom and chlorine atom, there is a tendency that $R_fOH$ has a high boiling point and the resulting paint is highly soluble.

The $R_f$ may be a group having the surface concentrating property. Examples are those represented by, for instance, $F(CF_2)_n(CH_2)_m$, $(CF_3)_2CH$, $H(CF_2)_n(CH_2)_m$, $F(CF_2)_n(CH_2)_m$ (=O, $H(CF_2)_n(CH_2)_mC=O$, $(F(CF_2)_n(CH_2)_m)_2N$, $((CF_3)_2CH)_2N$, $(H(CF_2)_n(CH_2)_m)_2N$, $F(CF_2)_nO(CF(CF_3)CF_2O)_m$ $CF(CF_3)C=O$, $(F(CF_2)_n(CH_2)_m)_2C=N$, $((CF_3)_2CH)_2C=N$, $(H(CF_2)_n(CH_2)_m)_2C=N$, $F(CF_2)_n(CH_2)_m C=ONR_3$, $H(CF_2)_n(CH_2)_mC=ONR_3$, $F(CF_2)_n(CH_2)_m C=CH_2$, $H(CF_2)_n(CH_2)_mC=CH_2$, $F(CF_2)_n(CH_2)_m C=CF_2$ and $H(CF_2)_n(CH_2)_mC=CF_2$, wherein m is 0 or an integer of 1 to 6, n is an integer of 1 to 10, $R^3$ represents an alkyl having 1 to 6 carbon atoms and may be branched.

Examples of those $R_f$ are, for instance, $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, $CF_3(CF_2)_7C=O$, and the like. From the viewpoints of availability, handling property, surface concentrating property in the resulting paint, hydrolyzability and removable property, $CF_3CH_2$, $CF_3CF_2CH_2$, $CF_3(CF_2)_2CH_2$, $CF_3(CF_2)_3 CH_2CH_2$, $CF_3C=O$ and $CF_3CF_2C=O$ are preferred, and $CH_3CH_2$ and $CF_3CF_2CH_2$ are further preferred.

In the formula (10), n is an integer of 1 to 10, preferably 2 to 10, further preferably 4 to 6. When n decreases, a boiling point of a starting silane compound becomes low at the time of synthesis and thus the synthesis is difficult. Also since a boiling point of the synthesized compound becomes low, there is a tendency that, for example, when the paint is spray-coated, the compound in the paint is easy to be evaporated and difficult to remain in the coating film. On the other hand, when n exceeds 10, there is a problem with repeatability of a synthesis reaction. Also when preparing a paint, there is a tendency that compatibility with a resin and curing agent is poor to lower storage stability, that appearance of the coating film is apt to be poor, that viscosity becomes high, and further that such a compound is difficult to obtain industrially.

All of $R^3$ are different or at least two of $R^3$ are the same. Each is a monovalent organic group having 1 to 1,000 carbon atoms.

The number of carbon atoms of $R^3$ is preferably from 1 to 100, more preferably from 1 to 16. When the number of carbon atoms decreases, there is a tendency that hydrolytic stability of starting material is poor and storage stability of the resulting paint is lowered. When the number of carbon atoms exceeds 1,000, there is a tendency that solubility of the starting material is lowered and that compatibility with a resin and hydrolyzability in the paint are lowered.

Any of $R^3$ may be a linear or branched substituent. From the viewpoint of solubility at the time of preparing a paint, a branched substituent is preferred.

Examples of $R^3$ are, for instance, $CH_3$, $C_2H_5$, $CH_3CH_2CH_2$, $(CH_3)_2CH$, $CH_3(CH_2)_2CH_2$, $CH_3CH_2CH_2CH_2CH(C_2H_5)CH_2$, a dimethylsiloxane chain-containing group and the like. From the viewpoints of easiness of substitution with alcohol, removable property, availability and workability, $CH_3$ and $C_2H_5$ are preferred and $CH_3$ is further preferred.

Examples of the compound represented by the formula (10) are, for instance,

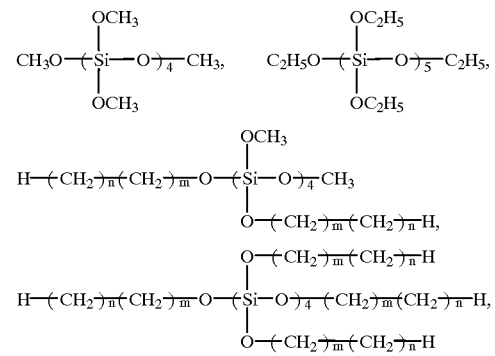

-continued

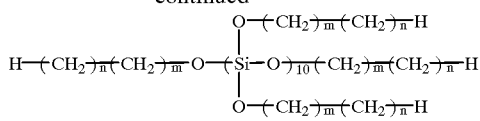

and the like.

From the viewpoints of solubility, removable property and availability, preferable are

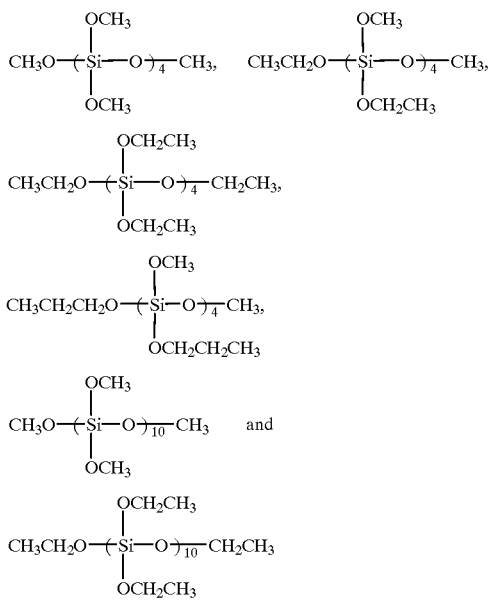

In the first synthesis, a catalyst may not be used. From a point of accelerating the reaction, however, he catalyst such as an acid, alkali, organometal compound or metal salt can be used.

Examples of the catalyst are, for instance, acids or alkalis such as hydrochloric acid, sulfuric acid, acetic acid, para-toluenesulfonic acid, ammonia, trimethylamine, triethylamine, tributylamine, 1,8-diazabicyclo(5.4.0)undecen-7 (DBU), (−)-sparteine, 4-N,N-dimethylaminopyridine, monoethanolamine, triethanolamine, N,N,N',N'-tetramethylethylenediamine, sodium hydroxide, potassium hydroxide, sodium hydrogencarbonate, potassium t-butoxide, sodium ethoxide, tetramethylammonium hydroxide, tetramethylammonium hydrogensulfate, tetrabutylammonium hydroxide and tetrabutylammonium hydrogensulfate; organometal compounds or metal salts such as dibutyltindilaurate, dibutyltinacetate, dioctyltinmaleate, tetraisopropyltitanate and tetrabutyltitanate; and the like. From a point that a residual catalyst is easy to be removed from the reaction product, ammonia, trimethylamine and triethylamine are preferred.

An example of the first synthesis process may be carried out in that, first, a 500 ml reaction vessel equipped with a thermometer, reflux pipe and dropping funnel is charged with 0.1 mole of the compound represented by the formula (10).

Then the compound represented by the formula (9) is introduced into the reaction vessel in an amount of 0.01 to 0.4(n+1) mole, preferably 0.1(n+1) to 0.2(n+1) mole. In this case, n is the same as one shown in the formula (10). When the amount of the compound represented by the formula (9) decreases, there is a tendency of a substitution ratio becoming lower. When the amount increases, cost tends to become high.

When a catalyst is used, the catalyst may be added in an amount of 0.01 to 10% by mole, preferably 0.1 to 2% by mole on the basis of silicon atoms in the reaction mixture.

When the amount of the catalyst becomes smaller, there is a tendency of a substitution ratio becoming lower. When the amount becomes larger, there is a tendency that removal of the residual catalyst becomes inconvenient.

Then the inside temperature of the reaction vessel is maintained in the range of 0° to 200° C., preferably 50° to 150° C. for 1 to 24 hours, preferably 2 to 10 hours.

When the temperature is lower, there is a tendency of a substitution ratio being lower and when the temperature is higher, there is a tendency that side reaction is easy to occur. When the time is shorter, there is a tendency of a substitution ratio being lower and when the time is longer, there is a tendency that side reaction is easy to occur.

Afterwards, the alcohol and, as the case demands, unreacted starting materials are removed through distillation, then 0.01 to 0.2 mole of a compound represented by the formula (11) or (12) is obtained.

0.05 To 0.2 mole of the compound represented by the formula (11) can be obtained by using 0.2(n+1) to 0.3(n+1) mole of the compound of the formula (9) and 0.5 to 2% by mole of the catalyst under the conditions of a temperature of 50° to 150° C. and a reaction time of 2 to 6 hours.

5 0.01 To 0.15 mole of the compound represented by the formula (12) can be obtained by using 0.1(n+1) to 0.2(n+1) mole of the compound of the formula (9) and 0.5 to 2% by mole of the catalyst under the conditions of a temperature of 50° to 150° C. and a reaction time of 2 to 6 hours.

As the second process for synthesis of the oligomer of the fluorine-containing silicate, there is, for example, a process in which tetrachlorosilane is allowed to react with a compound represented by the formula (9):

wherein $R_f$ is a monovalent organic group having 1 to 1,000 carbon atoms and may contain oxygen atom, nitrogen atom and/or silicon atom, a part or the whole of hydrogen atoms of said organic group is substituted by fluorine atom or fluorine atom and chlorine atom, and then the obtained compound represented by $(R_fO)_4Si$ is subject to condensation in an organic solvent to give an oligomer of a fluorine-containing silicate represented by the formula (12):

wherein n is an integer of 2 to 20, $R_f$ is the same as above.

It is preferable that the organic solvent is at least one selected from the group consisting of an alcohol solvent, ether solvent, ketone solvent, ester solvent, carboxylic acid solvent and fluorine-containing aromatic solvent.

In the above-mentioned second synthesis process, the number of carbon atoms of $R_f$ in the formula (9) is preferably from 1 to 100, more preferably from 1 to 16. When the number of carbon atoms decreases, there is a tendency that hydrolytic stability is decreased to lower storage stability of the resulting paints. When the number of carbon atoms exceeds 1,000, there is a tendency of solubility, compatibility with a resin and hydrolyzability being lowered.

Any of $R_f$ may be a linear or branched substituent. From the viewpoints of solubility at the time of synthesis and solubility at the time of preparing a paint, a branched substituent is preferred.

The $R_f$ may contain oxygen atom, nitrogen atom and/or silicon atom. From a point that side reaction is difficult to occur and from the viewpoint of surface concentrating property in application of the paint, a dimethylsiloxane chain-containing group is preferred when a silicon atom having non-hydrolyzable group is contained.

When a part of hydrogen atoms of $R_f$ is substituted by fluorine atom, there is a tendency that viscosity of the paint becomes lower and the paint is endowed with high surface concentrating property.

When a part of hydrogen atoms of $R_f$ is substituted by fluorine atom and chlorine atom, there is a tendency that solubility of starting materials becomes high and the resulting paint is highly soluble.

The $R_f$ may be a group having the surface concentrating property. Examples are those represented by, for instance, $F(CF_2)_n(CH_2)_m$, $(CF_3)_2CH$, $H(CF_2)_n(CH_2)_m$, $F(CF_2)_n(CH_2)_m C=O$, $H(CF_2)_n(CH_2)_m C=O$, $(F(CF_2)_n(CH_2)_m)_2N$, $((CF_3)_2 CH)_2N$, $(H(CF_2)_n(CH_2)_m)_2N$, $F(CF_2)_nO(CF(CF_3)CF_2O)_m$, $CF(CF_3)C=O$, $(F(CF_2)_n(CH_2)_m)_2C=N$, $((CF_3)_2CH)_2 C=N$, $(H(CF_2)_n(CH_2)_m)_2C=N$, $F(CF_2)_n(CH_2)_m C=ONR_3$, $H(CF_2)_n(CH_2)_m C=ONR_3$, $F(CF_2)_n(CH_2)_m C=CH_2$, $H(CF_2)_n(CH_2)_m C=CH_2$, $F(CF_2)_n(CH_2)_m C=CF_2$ and $H(CF_2)_n(CH_2)_m C=CF_2$, wherein m is 0 or an integer of 1 to 6, n is an integer of 1 to 10, $R^3$ represents an alkyl having 1 to 6 carbon atoms and may be branched.

Examples of those $R_f$ are, for instance, $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, $CF_3(CF_2)_7C=O$, and the like. From the viewpoints of availability, surface concentrating property in the resulting paint, hydrolyzability and removable property and from a point that side reaction is difficult to occur, $CF_3CH_2$, $CF_3CF_2CH_2$, $CF_3(CF_2)_2CH_2$, $CF_3(CF_2)_3CH_2CH_2$, $CF_3C=O$ and $CF_3CF_2C=O$ are preferred, and $CH_3CH_2$ and $CF_3CF_2CH_2$ are further preferred.

In the second synthesis, when the compound represented by the formula (12) is synthesized by subjecting the compound represented by $(R_fO)_4Si$ to condensation through hydrolysis, since the compound of $(R_fO)_4Si$ is difficult to be dissolved in water, an organic solvent is added to prevent gelling and to prevent non-uniform reaction.

Examples of the organic solvent are, for instance, alcohol solvents such as methanol, ethanol, isopropanol, n-butanol, t-butanol, octanol, 2,2,2-trifluoroethanol and 2,2,3,3,3-pentafluoropropanol; ether solvents such as tetrahydrofuran, 1,4-dioxane and tetrahydropyran; ketone solvents such as acetone; ester solvents such as 2-methoxyethyl acetate; carboxylic acid solvents such as acetic acid, trifluoroacetic acid and $F(CF_2)_8COOH$; fluorine-containing aromatic solvents such as trifluoromethylbenzene and m-bistrifluoromethylbenzene; and the like. From the viewpoint of high solubility, 2,2,2-trifluoroethanol, 2,2,3,3,3-pentafluoropropanol, tetrahydrofuran, 1,4-dioxane and tetrahydropyran are preferred.

An example of the second synthesis may be carried out in that, first, a 1,000 ml reaction vessel equipped with a thermometer, stirrer, reflux pipe, cooling unit and dropping funnel is charged with 1.0 mole of tetrachlorosilane under nitrogen atmosphere, followed by cooling to not more than 10° C.

Then the compound represented by the formula (9) is added dropwise in an amount of 3 to 5 moles, preferably 4 to 4.5 moles through the dropping funnel over 2 to 6 hours. When the amount of the compound of the formula (9) is smaller, there is a tendency that unreacted tetrachlorosilane is easy to remain, and when the amount is larger, cost tends to become higher.

Hydrogen chloride generated by the addition of the compound of the formula (9) is removed from the system through a polyvinyl chloride pipe and then trapped.

The temperature of the reaction mixture rises up to about 10° C. to about 15° C. Therefore, to complete the reaction, after the above-mentioned addition, the reaction mixture is cooled to about 5° C. to about 10° C. over 1 to 5 hours and then stirred until the generation of the hydrogen chloride stops.

Then the unreacted compound of the formula (9) is removed through distillation with heating. Through further distillation under reduced pressure, 0.5 to 1.0 mole of the compound represented by $(R_fO)4Si$ is obtained.

A 300 ml reaction vessel is charged with 0.15 mole of the obtained compound under nitrogen atmosphere, and a mixed solution comprising 1 to 100 ml, preferably 10 to 80 ml of the above-mentioned organic solvent, 0.01 to 5% by mole of a catalyst on the basis of silicon atom and 0.075 to 0.15 mole of water is added slowly with stirring.

When the amount of the organic solvent is smaller, the reaction tends to be not uniform, and when the amount is larger, reactivity tends to be lower. When the amount of the catalyst is smaller, reactivity tends to be lower, and when the amount is larger, removal of the residual catalyst tends to be difficult. When the amount of water is smaller, the degree of condensation tends to be lower, and when the amount is larger, the degree of condensation tends to be high.

At that time there is a case where white turbidity occurs in the system. Even in such a state, to complete the reaction, the mixture is stirred at 20° to 100° C. for 1 to 5 hours.

Then the mixture is heated to 50° to 150° C. to distill off the volatile components to obtain a product comprising 0.015 to 0.15 mole of the compound of the formula (12) as a main component in the reaction vessel.

In the present invention, the inventors found purification method for further increasing a purity of the fluorine-containing silicate or its oligomer obtained by the first synthesis or a purity of the oligomer of the fluorine-containing silicate obtained by the second synthesis, and thus the present invention has been completed.

As the purification method of the fluorine-containing silicate or its oligomer, there is a method wherein, for example, the fluorine-containing silicate or its oligomer is brought into contact with a metal oxide or ion exchange resin to remove impurities from the fluorine-containing silicate or its oligomer.

In order to bring the fluorine-containing silicate or its oligomer into contact with the metal oxide or ion exchange resin, there is a preferred method wherein the silicate or its oligomer is fed through a column filled with the metal oxide or ion exchange resin.

As the purification method, in addition to the method employing the column (column method), there is a preferred method wherein the metal oxide or ion exchange resin is put into the fluorine-containing silicate or its oligomer, stirred and then filtrated (batchwise method).

In the column method and batchwise method, the fluorine-containing silicate or its oligomer may be used as it is by dissolving in an organic solvent such as hexane, xylene, butyl acetate, tetrahydrofuran, diethyl ether, acetone or fluorine-containing alcohol.

The column method and batchwise method are carried out at a temperature of 0° to 100° C., preferably 20° to 30° C.

The use of the metal oxide is advantageous from the viewpoint of adsorption of impurities.

The use of the ion exchange resin is advantageous from the viewpoint of recycling capability.

Preferred metal oxide is, for example, a metal oxide having an average particle size of 1 to 10,000 μm, preferably 10 to 5,000 μm and a specific surface area of 0.01 to 100 $m^2/g$, preferably 0.1 to 10 $m^2/g$.

Preferred ion exchange resin is, for example, an ion exchange resin having an average particle size of 1 to 10,000 μm, preferably 10 to 5,000 μm, a specific surface area of 0.01 to 100 $m^2/g$, preferably 0.1 to 10 $m^2/g$ and an ion exchange capacity of 0.01 to 1,000 meq/g, preferably 0.1 to 100 meq/g.

Examples of the metal oxide are, for instance, hydrotalcite, magnesia, alumina, silica gel, hydroxyapatite, talc, zeolite, kaolinite, montmorillonite, Molecular Sieve and the like.

Examples of the commercially available metal oxide are, for instance, those available from Kyowa Kagaku Kogyo Kabushiki Kaisha such as Kyowaad 115 (MgO), Kyowaad 200 ($Al_2O_3.XH_2O$), Kyowaad 300 ($2.5MgO.Al_2O_3.XH_2O$), Kyowaad 400 ($Al_2O_3.Na_2O.XH_2O$), Kyowaad 500 ($Mg_6Al_2(OH)_{16}CO_3.4H_2O$), Kyowaad 600 ($2MgO.6SiO_2.XH_2O$), Kyowaad 700, 715 ($Al_2O_3.9SiO_2.XH_2O$), Kyowaad 815 ($Mg(OH)_2$), Kyowaad 1000 ($Mg_{4.5}Al_2(OH)_{13}CO_3.3.5H_2O$), Kyowaad 1015 ($Mg_{4.5}Al_2(OH)_{13}CO_3.3.5H_2O$, Particle size 1.5 mm), Kyowaad 2000 ($Mg_{1-x}Al_xO_{1+x/2}$, x=0.3) and Kyowaad 2015 ($Mg_{1-x}Al_xO_{1+x/2}$, x=0.3, Particle size 1.5 mm) and the like. From the viewpoint of adsorption of impurities, Kyowaad 600 is preferred.

As the ion exchange resin, there are, for example, a cation exchange resin and an anion exchange resin.

Examples of the commercially available ion exchange resin are, for instance, Dowex available from Dow Chemical Co., Ltd., Amberlite available from Rhom & Haas Co., Ltd., Diaion available from Mitsubishi Kagaku Kabushiki Kaisha and the like.

According to the purification method as mentioned above, the fluorine-containing silicate or its oligomer having higher purity can be obtained by removing a trace amount of impurities, for example, the residual catalyst, side reaction product, etc. contained in the fluorine-containing silicate or its oligomer. As a result, storage stability of the silicate or its oligomer, storage stability, pot life, workability and curability of the paints obtained therefrom can be further improved.

When the compound I is used for a paint, resin, film and sheet in the state of being dissolved together with a curing agent in an organic solvent such as xylene and butyl acetate, effects of enhancing stain-proofing property and stain removable property and giving antistatic property and antihaze property are exhibited.

The non-aqueous composition for paints of the present invention comprises the stain-proofing agent comprising the compound I; resin; curing agent and/or curing catalyst. The coating film obtained from the composition exhibits an effect of giving remarkably excellent stain-proofing property as mentioned above.

Examples of the resin are, for instance, a fluoroolefin copolymer having hydroxyl group and/or carboxyl group, acrylic polyol resin, acrylic silicon resin, fluorine-containing silicone resin, inorganic resin and the like which are solvent-soluble. The fluoroolefin copolymer having hydroxyl group and/or carboxyl group and acrylic polyol resin are preferred from a point that they have been widely used.

In addition to the above resins, there is a fluorine-containing resin (such as a vinylidene fluoride copolymer disclosed in JP-A-4-189879) which is solvent-soluble and has no functional group. The fluorine-containing resin can be blended in the above-mentioned resins having a functional group.

Examples of the fluoroolefin copolymer having hydroxyl group and/or carboxyl group are, for instance, those disclosed in each of JP-B-60-21686, JP-A-3-121107, JP-A-4-279612, JP-A-4-28707 and JP-A-2-232221. A number average molecular weight of the copolymer (measured by GPC) is from 1,000 to 100,000, preferably 1,500 to 30,000. When the molecular weight is less than 1,000, curability and weather resistance tend to be insufficient, and when more than 100,000, there is a tendency that problems arise with respect to workability and coating procedures.

A hydroxyl value of the copolymer is from 0 to 200 (mgKOH/g), preferably 0 to 150 (mgKOH/g). When the hydroxyl value decreases, there is a tendency that curing failure is easy to occur, and when the hydroxyl value exceeds 200 (mgKOH/g), there is a tendency that problem arises with respect to flexibility of a coating film.

An acid value of the copolymer is from 0 to 200 (mgKOH/g), more preferably 0 to 100 (mgKOH/g). When the acid value decreases, there is a tendency that curing failure is easy to occur, and when the acid value exceeds 200 (mgKOH/g), there is a tendency that problem arises with respect to flexibility of a coating film.

As one of the copolymers, there can be used tetrafluoroethylene copolymer from the viewpoints of stain-proofing property, stain removable property and corrosion resistance.

Examples of the copolymer are those commercially available, for instance, Zeffle available from Daikin Industries, Ltd., Lumiflon available from Asahi Glass Kabushiki Kaisha, Cefral Coat available from Central Glass Kabushiki Kaisha, Fluonate available from Dai Nippon Ink Kagaku Kogyo Kabushiki Kaisha, Zaflon available from Toa Gosei Kabushiki Kaisha and the like.

The acrylic polyol resin may be a polymer comprising, for example, the following hydroxyl-containing polymerizable unsaturated monomer (a) and if necessary, other polymerizable unsaturated monomer (b) as monomer components.

As the monomer (a), there can be exemplified a compound represented by the following formulae (2) to (5).

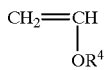
(2)

wherein $R^4$ is hydrogen atom or a hydroxyalkyl group.

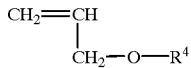
(3)

wherein $R^1$ is the same as above.

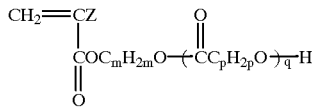
(4)

wherein Z is hydrogen atom or methyl, m is an integer of 2 to 8, p is an integer of 2 to 18, q is 0 or an integer of 1 to 7.

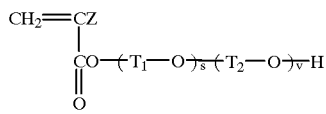
(5)

wherein Z is the same as above, $T_1$ and $T_2$ are the same or different and each is a divalent hydrocarbon group having 1 to 20 carbon atoms, each of s and v is 0 or an integer of 1 to 10, provided that the sum of s and v is 1 to 10.

The hydroxyalkyl group in the formulae (2) and (3) is one having alkyl moiety of 1 to 6 carbon atoms. Examples are —$C_2H_4OH$, —$C_3H_6OH$, —$C_4H_8OH$ and the like.

Examples of the divalent hydrocarbon group having 1 to 20 carbon atoms in the formula (5) are, for instance,

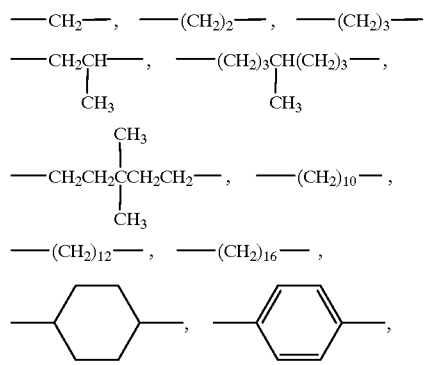

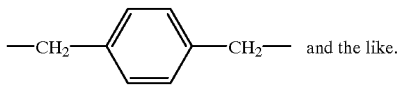 and the like.

Examples of the monomer component of the formula (2) are, for instance, $CH_2$=CHOH,
$CH_2$=CHO$(CH_2)_4$OH and the like, Examples of the monomer component of the formula (3) are, for instance, $CH_2$=CHCH$_2$OH,
$CH_2$=CHCH$_2$OCH$_2$CH$_2$OH,
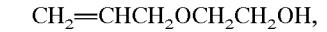  and the like, Examples of the monomer component of the formula (4) are, for instance, $CH_2$=C(CH$_3$)COOC$_2$H$_4$OH,
$CH_2$=CHCOOC$_3$H$_6$OH,

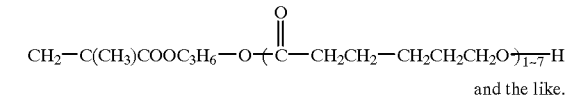
and the like.

Examples of the monomer component of the formula (5) are, for instance,

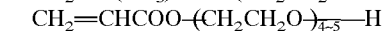
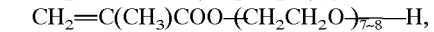
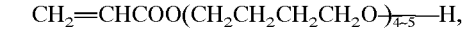
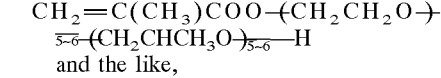
and the like,

In addition, there can be used an adduct of the hydroxyl-containing unsaturated monomer represented by the formulae (2) to (5) and lactone such as ε-caprolactone or γ-valerolactone.

Other polymerizable unsaturated monomer (b)

The following (b-1) to (b-9) can be used.

(b-1) Olefin compound: For example, ethylene, propylene, butylene, isoprene, chloroprene and the like.

(b-2) Vinyl ether and allyl ether: For example, linear alkyl vinyl ether such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether or 4-methyl-1-pentyl vinyl ether; cycloalkyl vinyl ether such as cyclopentyl vinyl ether or cyclohexyl vinyl ether; aryl vinyl ether such as phenyl vinyl ether or o-, m- or p-dimethylphenyl vinyl; arylalkyl vinyl ether such as benzyl vinyl ether or phenethyl vinyl ether; and the like.

(b-3) Vinyl ester and propenyl ester: For example, vinyl ester such as vinyl acetate, vinyl lactate, vinyl butyrate, vinyl isobutyrate, vinyl caproate, vinyl isocaproate, vinyl pivalate or vinyl caprate; propenyl ester such as isopropenyl acetate or isopropenyl propionate; and the like (b-4) Acrylate or methacrylate: For example, C1 to 18 alkyl ester of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate or lauryl methacrylate; C2 to 18 alkoxyalkyl ester of acrylic acid or methacrylic acid such as methoxybutyl acrylate, methoxybutyl methacrylate, methoxyethyl acrylate, methoxyethyl methacrylate, ethoxybutyl acrylate or ethoxybutyl methacrylate; and the like.

(b-5) Aromatic vinyl compound: For example, styrene, α-methylstyrene, vinyltoluene, p-chlorostyrene and the like.

(b-6) Others: Acrylonitrile, methacrylonitrile and the like.

(b-7) Carboxyl-containing monomer: Carboxyl-containing vinyl monomer represented by:

$$\begin{array}{c} R^5 \quad R^7 \\ | \quad | \\ C=C \\ | \quad | \\ R^6 \quad (CH_2)_n COOH \end{array} \quad (6)$$

wherein $R^5$, $R^6$ and $R^7$ are the same or different, and each is hydrogen atom, alkyl, phenyl, carboxyl or ester group, n is 0 or 1, or the formula (7):

$$CH_2=CH\text{-}(CH_2)_{\overline{n}}\text{-}O\text{-}(R^{13}OCO)_{\overline{m}}\text{-}R^{14}COOH \quad (7)$$

wherein $R^{13}$ and $R^{14}$ are the same or different, and each is saturated or unsaturated linear or cyclic alkyl, n is 0 or 1, m is 0 or 1. Examples thereof are, for instance, acrylic acid, methacrylic acid, vinylacetic acid, crotonic acid, cinnamic acid, 3-allyloxypropionic acid, itaconic acid, itaconic acid monoester, maleic acid, maleic acid monoester, maleic anhydride, fumaric acid, fumaric acid monoester, vinyl phthalate, vinyl pyromellitate and the like.

(b-8) Epoxy-containing monomer:

$$\begin{array}{c} CH_3 \\ | \\ CH_2=C \\ | \\ CO_2CH_2\text{-}CH\text{-}CH_2, \\ \diagdown O \diagup \end{array}$$

$$\begin{array}{c} CH_3 \\ | \\ CH_2=C \\ | \\ CO_2\text{-}CH_2\text{-}\bigcirc\!\!\!-\!\!O \end{array}$$

(b-9) Amino-containing monomer:

$$CH_2=CHCONH_2,$$

$$\begin{array}{c} CH_3 \\ | \\ CH_2=C \\ | \quad\quad\quad CH_3 \\ CO_2CH_2CH_2N\diagup \\ \diagdown CH_3 \end{array}$$

The acrylic polyol resin may contain hydroxyl, carboxyl, epoxy or amino.

A hydroxyl value of the acrylic polyol resin is from 0 to 200 (mgKOH/g), preferably 0 to 100 (mgKOH/g). When the hydroxyl value decreases, curing failure tends to occur easily, and when the hydroxyl value exceeds 200 (mgKOH/g), there is a tendency that problem arises with respect to flexibility of a coating film.

An acid value of the acrylic polyol resin is from 0 to 200 (mgKOH/g), preferably 0 to 100 (mgKOH/g). When the acid value decreases, curing failure tends to occur easily, and when the acid value exceeds 200 (mgKOH/g), there is a tendency that problem arises with respect to flexibility of a coating film.

Commercially available acrylic polyol resin is, for example, Dianal available from Mitsubishi Rayon Kabushiki Kaisha, Acrydic available from Dai Nippon Ink Kagaku Kogyo Kabushiki Kaisha, Hitaloid available from Hitachi Kasei Kogyo Kabushiki Kaisha, Olester available from Mitsui Toatsu Kagaku Kabushiki Kaisha or the like.

The acrylic silicon resin may be one prepared by polymerizing the following acrylic silicon monomer with the compound of the formulae (2) to (5) and/or other polymerizable unsaturated monomer (b).

The acrylic silicon resin is a compound having, in one molecule thereof, at least one silane group and a radical polymerizing unsaturated group. Examples of the radical polymerizing unsaturated group are, for instance:

$$\begin{array}{cc} R^8 & R^8 \\ | & | \\ CH_2=CCOO\text{---}, & CH_2=C\text{---}\bigcirc\text{---}, \end{array}$$

$$\begin{array}{cc} R^8 & \\ | & \\ CH_2=C\text{---}, & CH_2=CHO\text{---}, \\ CH_2=CHCH_2O\text{---} & \text{and the like,} \end{array}$$

wherein $R^8$ is hydrogen atom or methyl.

As the silane-containing polymerizable unsaturated monomer having a radical polymerizing unsaturated group of:

$$\begin{array}{c} R^8 \\ | \\ CH_2=CCOO\text{---} \end{array}$$

there is, for example, a compound represented by the following formula (8).

$$\begin{array}{ccc} R^8 & & Y \\ | & & | \\ CH_2=C\text{---}COOR^9\text{---}Si\text{---}Y \\ & & | \\ & & Y \end{array} \quad (8)$$

wherein $R^8$ is the same as above, $R^9$ is a hydrocarbon group having 1 to 20 carbon atoms, Y is the same or different and is hydrogen atom, hydroxyl, hydrolyzable group, alkyl having 1 to 8 carbon atoms, aryl or arylalkyl, provided that at least one of Y is hydrogen atom, hydroxyl or hydrolyzable group.

Examples of the compound represented by the formula (8) are, for instance,

γ-(meth)acryloxypropyltrimethoxysilane,
γ-(meth)acryloxypropyltriethoxysilane,
γ-(meth)acryloxypropyltripropoxysilane,
γ-(meth)acryloxypropylmethyldimethoxysilane, γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxybutylphenyldiethoxysilane,
γ-(meth)acryloxybutylphenyldipropoxysilane,
γ-(meth)acryloxypropyldimethylmethoxysilane,
γ-(meth)acryloxypropyldimethylethoxysilane,
γ-(meth)acryloxypropylphenylmethylmethoxysilane,
γ-(meth)acryloxypropylphenylmethylethoxysilane,
γ-(meth)acryloxypropyltrisilanol,
γ-(meth)acryloxypropylmethyldihydroxysilane,
γ-(meth)acryloxybutylphenyldihydroxysilane,
γ-(meth)acryloxypropyldimethylhydroxysilane,
γ-(meth)acryloxypropylphenylmethylhydroxysilane and the like.

The acrylic silicon resin may have a hydrolyzable silyl group, hydroxyl or epoxy.

Commercially available acrylic silicon resin is, for example, Gemlac available from Kaneka Corporation, Kuriyamer available from Sanyo Kasei Kogyo Kabushiki Kaisha or the like.

In the present invention, as the above-mentioned resin, there can be used inorganic materials such as a metal (Si, Ti, Al, etc.) alkoxide containing non-hydrolyzable group, an organopolysiloxane containing non-hydrolyzable group and a metal (Si, Ti, Al, etc.) alkoxide having no fluorine atom.

Commercially available inorganic material is, for example, Ecolton available from Gunze Sangyo Kabushiki Kaisha, Glaska available from Nippon Gosei Rubber Kabushiki Kaisha, Porcelin available from Tohpe Kabushiki Kaisha, Bell Clean and Bell Hard available from Nippon Yushi Kabushiki Kaisha, SH, SR and DC Series available from Toray Dow Corning Silicone Kabushiki Kaisha, KR Series available from Shin-Etsu Kagaku Kogyo Kabushiki Kaisha, Planeact available from Ajinomoto Kabushiki Kaisha, organotitanate available from Nippon Soda Kabushiki Kaisha, aluminium alcolate and aluminium chelate compound available from Kawaken Fine Chemical Kabushiki Kaisha, zirconium alkoxide available from Hokko Kagaku Kabushiki Kaisha, modified silicone oil and MMCA available from Nippon Nuicar Kabushiki Kaisha or the like.

Examples of the fluorine-containing silicone resin are, for instance, those disclosed in JP-A-4-279612 and the like.

As the curing agent, there may be used, for instance, isocyanate compound, blocked isocyanate compound, melamine resin, dibasic acid, silane compound containing non-hydrolyzable group, epoxy resin, acid anhydride or the like. From the viewpoints of weather resistance and acid rain resistance, preferable are isocyanate, blocked isocyanate and epoxy resin.

Examples of the isocyanate compound and blocked isocyanate compound are, for instance, 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, blocked isocyanates and the like. The isocyanate compound and blocked isocyanate compound are not limited to them.

A mixing ratio of the isocyanate to the resin is preferably from 0.5 to 5.0 in NCO/OH (mole ratio), further preferably 0.8 to 1.2. When the isocyanate is of moisture curing type, 1.1 to 1.5 is preferred.

Non-restricted examples of the melamine resin are, for instance, a melamine resin, a methylolated melamine resin obtained by methylolating melamine, an alkyl-etherified melamine resin obtained through etherification of a methylolated melamine by an alcohol such as methanol, ethanol or butanol and the like.

Non-restricted examples of the epoxy compound are, for instance,

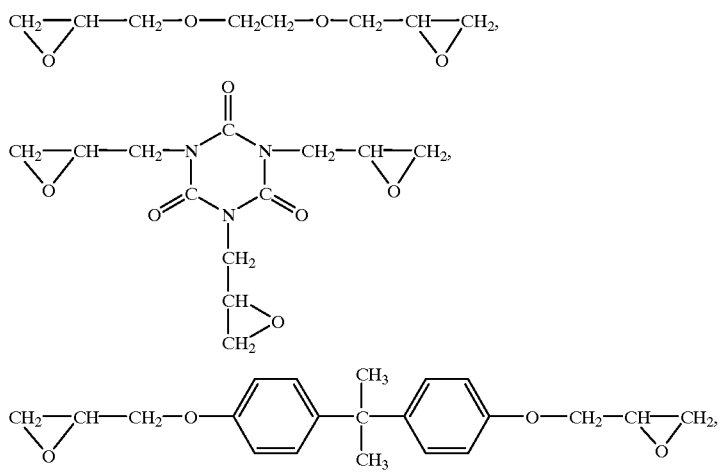

and the like.

Non-restricted examples of the acid anhydride are, for instance, phthalic anhydride, trimellitic anhydride, pyromellitic anhydride, 1,2-cyclohexyldicarboxylic anhydride, succinic anhydride, maleic anhydride and the like.

Dibasic acids such as fumaric acid, succinic acid, adipic acid, azelaic acid, sebacic acid, dodecanedioic acid and 1,2-cyclohexyldicarboxylic acid are also used as the curing agent.

Examples of the curing catalyst are, for instance, organotin compound, organic acidic phosphate, organotitanate compound, reaction product of acidic phosphate and amine, saturated or unsaturated polycarboxylic acid or its acid anhydride, organic sulfonic acid, amine compound, aluminium chelate compound, titanium chelate compound, zirconium chelate compound and the like.

Examples of the organotin compound are, for instance, dibutyltindilaurate, dibutyltinmaleate, dioctyltinmaleate, dibutyltindiacetate and the like.

Examples of the organic acidic phosphate are, for instance,

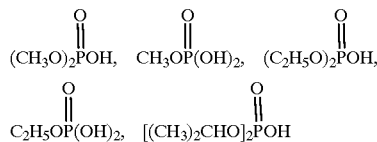

and the like.

Examples of the organotitanate compound are, for instance, titanate such as tetrabutyl titanate, tetraisopropyl titanate or triethanolamine titanate.

Further examples of the amine compound are, for instance, amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine or 1,8-diazabicyclo(5.4.0)undecen-7 (DBU) and a salt thereof with carboxylic acid; low molecular weight polyamide resin obtained from excess polyamine and polybasic acid; reaction product of excess polyamine and epoxy compound; and the like.

Examples of the chelate compound are, for instance, aluminium tris(acetylacetonate), zirconium tetrakis(acetylacetonate), bis(ethylacetoacetate)titanium diisopropoxide and the like.

The curing catalyst may be used alone or in combination of two or more.

In the present invention, combination of the resin and the curing agent and/or curing catalyst is not particularly limited. Examples of the preferred combination are those mentioned below.

In case of the acrylic polyol resin or the fluoroolefin copolymer having hydroxyl group and/or carboxyl group, when they contain hydroxyl group, the curing agent is the isocyanate compound, blocked isocyanate compound or melamine resin, and when they contain carboxyl group, the curing agent is the melamine resin or epoxy compound. In these systems, the curing catalyst can be used together.

In case of the acrylic silicon resin, fluorine-containing silicone resin or inorganic material, the curing catalyst may be used.

With respect to mixing amount of the resin and the stain-proofing agent having the organic group without fluorine atom, an amount of the stain-proofing agent is from 40 to 80 parts by weight, preferably 50 to 70 parts by weight based on 100 parts by weight of the resin. When the amount is less than 40 parts by weight, stain-proofing property tends to be lowered, and when the amount exceeds 80 parts by weight, there is a tendency that appearance of a coating film becomes poor or hardness of the film becomes low and compatibility with the resin is lowered.

With respect to mixing amount of the resin and the stain-proofing agent having the organic group with fluorine atom, an amount of the stain-proofing agent is from 0.1 to 50 parts by weight, preferably 1 to 30 parts by weight based on 100 parts by weight of the resin. When the amount is less than 0.1 part by weight, stain-proofing property tends to be lowered, and when the amount exceeds 50 parts by weight, there is a tendency that appearance of a coating film becomes poor and compatibility with the resin is lowered.

The number of fluorine atoms contained in the group having surface concentrating property is from 1 to 50, and is preferably from 3 to 9 from the viewpoints of hydrolyzability and removable property.

In that case, a content of fluorine atom in the compound I is at least 5%, and is preferably from 15 to 60%, more preferably 25 to 50% from the viewpoints of surface concentrating property and hydrolyzability.

In the present invention, an organic solvent can be mixed to the composition particularly when at least one of the organic groups is the group having surface concentrating property and other organic groups are $CH_3$ and/or $C_2H_5$.

Examples of the organic solvent are, for instance, hydrocarbon solvent such as xylene, toluene, Solvesso 100, Solvesso 150 or hexane; ester solvent such as methyl acetate, ethyl acetate, butyl acetate, ethylene glycol monomethyl acetate, ethylene glycol monoethyl acetate, ethylene glycol monobutyl acetate, diethylene glycol monomethyl acetate, diethylene glycol monoethyl acetate, diethylene glycol monobutyl acetate, ethylene glycol acetate or diethylene glycol acetate; ether solvent such as dimethyl ether, diethyl ether, dibutyl ether, ethylene glycol monomethyl ether, ethylene glycol monoethyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol monobutyl ether, diethylene glycol dimethyl ether, diethylene glycol diethyl ether, diethylene glycol dibutyl ether or tetrahydrofuran; ketone solvent such as methyl ethyl ketone, methyl isobutyl ketone or acetone; amide solvent such as N,N-dimethylacetamide, N-methylacetamide, acetamide, N,N-dimethylformamide, N,N-diethylformamide or N-methylformamide; sulfonic acid ester solvent such as dimethylsulfoxide; alcohol solvent such as methanol, ethanol, isopropanol, butanol, ethylene glycol, diethylene glycol, polyethylene glycol (degree of polymerization: 3 to 100), polyvinyl alcohol, $CF_3CH_2OH$, $F(CF_2)_2CH_2OH$, $(CF_3)_2CHOH$, $F(CF_2)_3CH_2OH$, $F(CF_2)_4C_2H_5OH$, $H(CF_2)_2CH_2OH$, $H(CF_2)_3CH_2OH$ or $H(CF_2)_4CH_2OH$; and the like. From the viewpoints of compatibility, appearance of the coating film and storage stability, preferable are alcohol solvents such as lower alcohol and lower fluorine-containing alcohol.

With respect to mixing amount of the resin and the alcohol solvent, an amount of the alcohol solvent is from 1 to 50 parts by weight based on 100 parts by weight of the resin, preferably from 1 to 25 parts by weight from the viewpoints of curability and appearance of a coating film.

When the curing agent has high reactivity with alcohol like a room temperature curing type isocyanate, the amount of the alcohol solvent is further preferably from 1 to 15 parts by weight, and the preferred alcohol is a secondary or tertiary alcohol.

The non-aqueous composition for paints of the present invention is excellent in solvent solubility, and a formed coating film has high weather resistance and is excellent in stain-proofing property, chemical resistance, optical properties, mechanical properties, adhesion to substrates, resistance to yellowing due to heat, etc. Like usual curing compositions, the non-aqueous composition for paints of the present invention can be applied as paints for indoor use for building materials and interior materials or for outdoor use for building materials, cars, air planes, ships, trains, etc., directly on metals, concrete, plastics or on a primer paint such as wash primer, rust preventive paint, epoxy resin paint, acrylic resin paint and polyester resin paint, and further can be used as a sealing agent and film forming agent.

The above-mentioned composition can be used in various manners, for example, in clear, in solid and in blend with filler.

Various coating methods can be employed, for example, spray coating, brush coating, roller coating, curtain flow and dip coating.

To the non-aqueous composition for paints of the present invention can be added, for example, pigment, pigment dispersing agent, thickener, leveling agent, defoaming agent, auxiliary for film forming, ultraviolet ray absorber, HALS, flatting agent, filler, colloidal silica, fungus preventing agent, silane coupling agent, anti-skinning agent, antioxidant, flame retardant, anti-drip agent, anti-static agent, rust preventing agent and the like.

Examples of the pigment are, for instance, titanium oxide, iron oxide, aluminum metallic pigment, carbon black, sintered pigment, phthalocyanine pigment, organic pigment, extended pigment and the like.

Examples of the titanium oxide are, for instance, Tipaque CR-90, CR-93, CR-95 and CR-97 available from Ishihara Sangyo Kabushiki Kaisha and the like.

Examples of the iron oxide are, for instance, Todacolor 120ED, 140ED, 160ED, KN-R and KN-V available from Toda Kogyo Kabushiki Kaisha, TAROX LL-XLO, HY-100, HY-200, BL-100 and BL-500 available from Titan Kogyo Kabushiki Kaisha and the like.

Examples of the aluminium metallic pigment are, for instance, Alpaste 0100MA, 0700M, 0200M, 0215M, 1950M, 1900M, 1100M, 1109M, 1200M, 8820YF, 7080N, MG600 and 1700N available from Toyo Aluminium Kabushiki Kaisha and the like.

Examples of the carbon black are, for instance, MA7, MA11, MA100, OIL7B, OIL30B and OIL31B available from Mitsubishi Kagaku Kabushiki Kaisha and the like.

Examples of the sintered pigment are, for instance, Daipyroxide #9510, #9512, #9410 and #9310 available from Dainichi Seika Kabushiki Kaisha and the like.

Examples of the phthalocyanine pigment are, for instance, #5195N and #5370 available from Dainichi Seika Kabushiki Kaisha and the like.

Examples of the extended pigment are, for instance, asbestine, calcium carbonate, precipitated calcium carbonate, clay, kaolin, porcelain clay, aluminium silicate, diatomaceous earth, white carbon, white silica, hydrated fine silica, bentonite, talc, magnesium silicate, magnesium carbonate, baryte powder, barium sulfate, precipitated barium sulfate and the like.

Examples of the pigment dispersing agent are, for instance, those available from BYK Chemie Japan Ltd., such as Anti-Terra-P, Anti-Terra-U, Anti-Terra-203/204, Disperbyk, Disperbyk-101, Disperbyk-110, Disperbyk130, Disperbyk161, Disperbyk-164, Disperbyk-170, Bykumen, BYK-P104/P105, BYK-104S, BYK-240S and Lactimon and the like.

Examples of the leveling agent are, for instance, those available from BYK Chemie Japan Ltd., such as BYK-300, BYK-302, BYK-306, BYK-307, BYK-335, BYK-310, BYK-320, BYK-322, BYK-323, BYK-324, BYK-325, BYK-330, BYK-331, BYK-333, BYK-344, BYK-370, BYK-354, BYK-355 and BYK-358 and the like.

Examples of the thickener are, for instance, Disparlon #6900-20X, #6900-10S, #4200-20 and #4200-10 available from Kusumoto Kasei Kabushiki Kaisha, Bentone SD-1, SD-2, SD-3, #27, #34, #38 and MPA-2000X available from NL Chemicals Kabushiki Kaisha and the like.

Examples of the defoaming agent are, for instance, those available from BYK Chemie Japan Ltd., such as BYK-051, BYK-052, BYK-053, BYK-055, BYK-057, BYK-065, BYK-066, BYK-070, BYK-077, BYK-080, BYK-088, BYK-141 and the like.

Examples of the suitable ultraviolet ray absorber are, for instance, those of benzophenone type and benzotriazole type. Among them, effective benzophenone type absorbers are 2,2'-dihydroxy-4,4'-dimethoxybenzophenone, 2,2'-dihydroxy-4,-methoxybenzophenone and 2,2',4,4'-tetrahydroxybenzophenone, and effective benzotriazole type absorbers are 2-(2'-hydroxy-5'-methylphenyl)benzotriazole, 2-(2'-hydroxy-5'-methylphenyl)-5,6-dichlorobenzotriazole, 2-(2'-hydroxy-5'-tert-butylphenyl)benzotriazole, 2-(2'-hydroxy-3',5'-di-tert-butylphenyl)-5-chlorobenzotriazole, 2-(2'-hydroxy-5'-phenylphenyl)-5-chlorobenzotriazole, 2-(2'-hydroxy-3-tert-butylphenyl)-5-chlorobenzotriazole, 2-(2'-hydroxy-3',5'-di-tert-butylphenyl)benzotriazole and 2-(2'-hydroxy-5'-tert-octylphenyl)benzotriazole.

Particularly suitable ultraviolet ray absorbers are those represented by the formula (13):

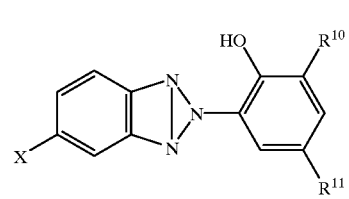

(13)

wherein $R^{10}$ and $R^{11}$ are the same or different, and each is hydrogen atom, a lower alkyl group, particularly a branched lower alkyl group or an aryl, particularly phenyl, X is hydrogen atom or a halogen atom, particularly chlorine atom.

Examples of HALS are, for instance, Tinuvin-770, 292, 622123 and 440 available from Ciba Geigy and the like.

Examples of the flatting agent are, for instance, Selidast #3620, #9615A, #9612A, 3715 and #3910, Hoechst Wax PE520 and white carbon which are available from Hoechst Industries Co., Ltd., and the like.

Examples of the silane coupling agent are, for instance, methyltrimethoxysilane, ethyltriethoxysilane, dimethyldimethoxysilane, trimethylmethoxysilane, vinyltrimethoxysilane, 3-(glycidyloxy) propyltrimethoxysilane, N-(2-aminoethyl)-3-aminopropyltrimethoxysilane, 3-aminopropyltrimethoxysilane, 3-aminopropyltriethoxysilane, 3-mercaptopropyltrimethoxysilane, 3-trimethoxysilylpropylisocyanate, 3-triethoxysilylpropylisocyanate and the like. Preferred silane coupling agents are those having amino group or isocyanate group. Particularly one having the isocyanate group is excellent in recoatability and intercoat adhesion of coating films for repairing. Further more preferable is one having an alkylisocyanate group such as 3-trimethoxysilylpropylisocyanate.

The non-aqueous composition for paints of the present invention can be applied to various substrates. Examples of the substrate are, for instance, those made of metal, cement, plastic, etc.

Examples of the metal substrate are, for instance, iron and chemically treated or plated iron, aluminium and chemically treated aluminium, stainless steel and chemically treated stainless steel and the like.

Examples of the cement substrate are, for instance, cement, lime, gypsum, concrete, cement mortar, asbestos slate, gypsum board and the like.

Examples of the plastic substrate are, for instance, polyvinyl chloride, polyester, polycarbonate, acryl, polyolefin, polystyrene, polyurethane, polyamide, nylon, natural rubber, urethane rubber, ABS resin and the like.

In case of the metal substrate, it is preferable from the viewpoints of corrosion resistance and intercoat adhesion that the non-aqueous composition for paints of the present invention is applied after under coating and intermediate coating as mentioned below.

As the under coat paint, a zinc rich paint is preferred.

Examples of a vehicle for organic zinc rich paint are, for instance, chlorinated rubber, polystyrene resin, silicone resin, combination of epoxy resin-polyamide resin and the like. Examples of a vehicle for inorganic zinc rich paint are, for instance, ethyl silicate, sodium silicate, lithium silicate, potassium silicate, ammonium silicate and the like. The vehicles particularly preferred for the purposes of the present invention are combination of epoxy resin-polyamide resin, ethyl silicate, potassium silicate and lithium silicate.

Examples of other preferred under coat paints and intermediate coat paints are paints obtained by adding a usually employed coloring pigment, extended pigment, antisettling agent, dispersing agent, curing agent, curing accelerator, thinner, solvent, etc. to at least one synthetic resin selected from epoxy resin (including tar- or urethane-modified one), vinyl resin (including tar-modified resin and acrylic resin), chlorinated resin, polyurethane resin and phenol resin, and then kneading.

The above-mentioned epoxy resin is a resin which has two or more epoxy groups in its molecule and is used usually for paints.

As the epoxy resin, there can be cited, for example, bisphenol epoxy resin such as commercially available Epikote 828, 834, 836, 1001, 1004 and DX-255 which are trade names of Shell Kagaku Kabushiki Kaisha, Araldite GY-260 which is trade name of Ciba Geigy, DER 330, 331 and 337 which are trade names of Dow Chemical or Epiclon 800 which is trade name of Dai Nippon Ink Kagaku Kogyo Kabushiki Kaisha; phenol-novolac epoxy resin such as commercially available DEN 431 and 438 which are trade names of Dow Chemical; polyglycol epoxy resin such as commercially available Araldite CT-508 which is trade name of Ciba Geigy or DER-732 and 736 which are trade names of Dow Chemical; ester epoxy resin such as Epiclon 200 and 400 which are trade names of Dai Nippon Ink Kagaku Kogyo Kabushiki Kaisha; and cotton-like aliphatic epoxy resin such as an epoxidated polybutadiene like BF-1000 which is trade name of Nippon Soda Kabushiki Kaisha.

Epoxy compounds easily analogized from the above-mentioned epoxy resin and derivatives of the epoxy resin are also usable similarly and are encompassed within the technical scope of the present invention.

For example, polyol epoxy resin, alicyclic epoxy resin, halogen-containing epoxy resin and the like are encompassed therein.

To the epoxy resin can be mixed bituminous materials such as mineral bitumen, asphaltite, asphaltic pyrobitumen, tar, coal tar, artificial asphalt and pitch.

As the curing agent for the epoxy resin, there can be used those usually used for paints, such as amine adduct and polyamide resin.

As the curing agent, there are cited, for instance, polyamide resins such as commercially available Tohmide Y-25, 245, 2400 and 2500 which are trade names of Fuji Kasei Kogyo Kabushiki Kaisha, Zenamide 2000 and Versamide 115 and 125 which are trade names of Dai-ichi General Kabushiki Kaisha, Sunmide 320, 330 and X2000 which are trade names of Sanwa Kagaku Kabushiki Kaisha, and Epicure 3255 and 4255 which are trade names of Shell Kagaku Kabushiki Kaisha; amine adducts such as Tohmide 238 and Fujicure 202 which are trade names of Fuji Kasei Kogyo Kabushiki Kaisha and Adeca Hardener EH-531 which is trade name of Asahi Denka Kabushiki Kaisha; aliphatic polyamines such as Sunmide T-100, D-100 and P-100 which are trade names of Sanwa Kagaku Kabushiki Kaisha; and heterocyclic diamine derivatives such as Epomate B-002, C-002 and S-005 available from Ajinomoto Kabushiki Kaisha.

An adding amount of the curing agent is about an equivalent to the epoxy resin, namely in the range of about 0.7 to about 1.3 equivalents to 1 equivalent of the epoxy resin.

As the curing agent for the epoxy resin, polyisocyanate can also be used.

Examples of the vinyl resins used in the present invention are, for instance, copolymer comprising one or more of monomers such as vinyl chloride, vinylidene chloride, vinyl acetate, vinyl propionate, styrene, vinyl toluene, vinyl alcohol, acrylic acid, methacrylic acid, maleic anhydride, alkyl acrylate and alkyl methacrylate. Examples thereof are vinyl chloride resin, vinyl chloride-vinyl acetate copolymer resin, acrylic resin and the like.

A chlorinated rubber resin used in the present invention is chlorinated natural rubber which is a compound containing usually 65 to 68% of chlorine.

The chlorinated rubber can be used in the mixture with rosin, coumarone-indene resin, phenol resin, vinyl chloride resin, petroleum resin, nitrile rubber, chloroprene rubber or alkyd resin.

The chlorinated rubber can also be used in the mixture with plasticizer such as chlorinated paraffin, diphenyl chloride, dioctyl phthalate or tricresyl phosphate.

The polyurethane resin used in the present invention is a composition comprising, as a main component, a compound having two or more active hydrogens in its molecule such as polyester polyol, polyether polyol, polyoxyalkylene glycol or acrylic polyol which is obtained from polybasic acid and polyol, and the above-mentioned curing agent, i.e. polyisocyanate having two or more isocyanate groups in its molecule.

When the substrate is the cement substrate, it is preferable that the non-aqueous composition for paints of the present invention is applied on an under coating and intermediate coating as mentioned below.

As the under coat paint, it is particularly preferable to use multi-layer finish paints such as multi-layer finish paint of non-curable synthetic resin emulsion, multi-layer pattern finish paint of reaction-curable aqueous epoxy resin and multi-layer finish paint of reaction-curable solvent-based epoxy resin. The resin component of the non-curable synthetic resin emulsion includes, for example, acrylic resin, vinyl acetate resin and modified resins thereof. Also the curing system of the reaction-curable aqueous or solvent-based epoxy resin includes, for example, epoxy-polyamine, epoxy-polyamide, epoxy-polyaminepolyamide and the like.

The under coat paint on the cement substrate can be applied by, for example, spray coating method, roller coating method, etc. It appears that a sufficient applying amount is usually from 0.5 to 2.0 kg/m$^2$. In general, drying is carried out usually for 1 to 3 days.

Before applying the under coat paint to the cement substrate, known primer, surface sealer or the like which has been used in general for surface preparation for building can be applied previously. In addition to the above-mentioned under coat paint, the present invention includes direct coating of a sealer of solvent-based epoxy resin or coating of the sealer and then smooth-finishing with isocyanate curing resin paint, etc.

The non-aqueous composition for paints of the present invention can be applied to the under coating film by, for example, roller coating method, brush coating method, spray coating method, etc. An applying amount is from 0.05 to 0.5 kg/m$^2$, preferably from 0.1 to 0.3 kg/m$^2$. A cured coating film can be formed by drying at normal temperature for at least one day.

A repair coating method comprises, for example, applying the non-aqueous composition for paints of the present invention after necessary surface preparation of the existing top coating film on the cement substrate for exterior of buildings.

In the above method, the existing top coating is not particularly limited. The particularly preferred top coating film is one formed by using paints as used for the composition of the present invention, i. e. a non-crosslinkable solvent-based paint such as curable fluorine-containing paint, curable acrylic paint, acrylic silicon paint, carbonyl-hydrazide curable aqueous paint or vinyl acetate-modified acrylic resin paint and a non-crosslinkable aqueous paint such as acrylic resin aqueous paint.

Examples of the carbonyl-hydrazide curable aqueous paint are ones prepared by mixing a water dispersion of a carbonyl-containing copolymer with a hydrazide crosslinking agent and an aqueous polyurethane resin having hydrazine residue (for example, JP-A-4-171683). Between the existing top coating and the cement substrate may have been applied a primer and surfacer or thereon may have been applied multi-layer paints.

The surface preparation to be made, if occasion demands, on the existing top coating can be carried out, for example, by applying a surface treating agent mentioned below. Examples of the preferred surface treating agent are, for instance, a cement type filler or surfacer (for example, cement/synthetic resin emulsion, etc.), reaction-curable resin permeable sealer (for example, epoxy polyamine, epoxy polyamide, etc.), and the like.

The surface preparation can be carried out by applying the surface treating agent by means of, for example, roller, brush, etc. An applying amount of the surface treating agent is, for example, from 0.3 to 2.0 kg/m$^2$ in case of the filler, from 0.1 to 1.0 kg/m$^2$ in case of the surfacer and from 0.01 to 0.5 kg/m$^2$ in case of the permeable sealer.

After the application of the surface treating agent, a polyisocyanate curable solvent-based paint can be further applied by means of, for example, roller coating method, brush coating method or spray coating method. It appears that a sufficient applying amount is from 0.05 to 0.5 kg/m$^2$. The drying of the surface treating agent and polyisocyanate curable solvent-based paint is carried out 1 to 3 times. The application and drying of the non-aqueous composition for paints of the present invention can be carried out in the same manner as mentioned above.

Also in case of the plastic substrate, the non-aqueous composition for paints of the present invention can be applied after the application of the under coating and intermediate coating as used in the metal substrate and cement substrate.

Among the plastic substrates, in case of a plastic film and sheet, there are applying methods, for example, gravure roll coating, doctor blade coating, roll coating, reverse roll coating, air knife coating, etc. In those applying methods, a suitable coating thickness is from 1 to 20 $\mu$m, preferably from 5 to 10 $\mu$m from the viewpoints of appearance of a coating film and coatability.

Examples of uses of articles coated with the non-aqueous composition for paints of the present invention are, for instance, water-proof sheet for agriculture, water-proof sheet for tunnel, polyvinyl sheet for agriculture, polyvinyl film for agriculture, covering sheet, protection sheet for building, protection sheet for train, mesh sheet, mesh screen, polycarbonate roof, acryl board wall, polycarbonate wall, guardrail, traffic signal, inner wall of tunnel, inner plate for tunnel, road sign, guidance plate, side wall of highway, sound-isolation wall for highway, road light, bridge beam, bridge girder, bridge pier, chimney, wall paper, tatami-mat, floor mat, table cloth, ventilation fan, marking film, geo-membrane, advertisement board, mail box, electric-light pole, tent, car, airplane, ship, train, and the like.

Then the present invention is explained by means of examples and the present invention is not limited to them.

PREPARATION EXAMPLE 1

A 300 ml three necked flask equipped with a thermometer, reflux pipe and dropping funnel was charged with 147 g (1.47 mole) of 2,2,2-trifluoroethanol (hereinafter referred to as "3FOH"). With stirring and bubbling of nitrogen, 50.0 g (0.294 mole) of tetrachlorosilane was added through the dropping funnel over one hour, and generated hydrogen chloride was trapped in an aqueous alkali solution. After the dropwise addition, the reaction solution was heated and stirred at 60° C. for one hour. The residual 3FOH was removed from the reaction mixture through distillation, and 111 g of the reaction product was obtained through distillation. As a result of NMR and elementary analyses, a fluorine content of the product was 54%. The structural formula of the obtained compound determined on the basis of the data of NMR and elementary analyses is shown below.

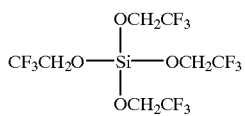

The obtained product is hereinafter referred to as "3F-54".

PREPARATION EXAMPLE 2

A 300 ml three necked flask equipped with a thermometer, reflux pipe and dropping funnel was charged with 50.0 g (0.106 mole as a tetramer) of Methyl Silicate 51 (methyl silicate tetramer(average) available from Colcoat Co., Ltd.) and 239 g (1.60 mole) of 2,2,3,3,3-pentafluoropropanol (hereinafter referred to as "5FP"), followed by heating at 85° to 120° C. to remove components which could be distilled during a period of four hours. As a result of NMR and elementary analyses, the product (Yield: 62 g) left in the flask was a compound having a fluorine content of 21%. The obtained product is hereinafter referred to as "5F-21".

PREPARATION EXAMPLE 3

The same reaction procedures as in Preparation Example 2 were repeated except that 0.11 g of triethylamine was added as a reaction catalyst. As a result of NMR and elementary analyses, a fluorine content of the product (Yield: 97 g) was 46%. The obtained product is hereinafter referred to as "5F-46".

PREPARATION EXAMPLE 4

The same reaction procedures as in Preparation Example 2 were repeated except that 212 g of 3FOH was added instead of 5FP and 0.11 g of triethylamine was added as a reaction catalyst. As a result of NMR and elementary analyses, a fluorine content of the product (Yield: 90.2 g) was 41%. The obtained product is hereinafter referred to as "3F-41".

PREPARATION EXAMPLE 5

The same reaction procedures as in Preparation Example 2 were repeated except that 74.0 g of $F(CF_2)_4C_2H_4OH$ (hereinafter referred to as "9FOH") was used instead of 5FP. A fluorine content of the product (Yield: 110 g) was 42%. The obtained product is hereinafter referred to as "9F-42".

PREPARATION EXAMPLE 6

The same reaction procedures as in Preparation Example 2 were repeated except that 148 g of 9FOH was used instead of 5FP. A fluorine content of the product (Yield: 170 g) was 52%. The obtained product is hereinafter referred to as "9F-52".

PREPARATION EXAMPLE 7

The same reaction procedures as in Preparation Example 2 were repeated except that 64.8 g of $F(CF_2)_8C_2H_4OH$ (hereinafter referred to as "17FOH") was used instead of 5FP. A fluorine content of the product (Yield: 104 g) was 42%. The obtained product is hereinafter referred to as "17F-42".

PREPARATION EXAMPLE 8

The same reaction procedures as in Preparation Example 2 were repeated except that 130 g of 17FOH was used instead of 5FP. A fluorine content of the product (Yield: 158 g) was 53%. The obtained product is hereinafter referred to as "17F-53".

PREPARATION EXAMPLE 9

A one-liter three necked flask was charged with 150 g of tetrachlorosilane under nitrogen atmosphere, followed by cooling to not more than 10° C., and thereto was added dropwise 582 g of 2,2,3,3,3-pentafluoropropanol through a dropping funnel over four hours. Generated hydrogen chloride was discharged outside the system through a vinyl chloride pipe, and then trapped. After the dropwise addition, a temperature of the reaction mixture was gradually cooled to room temperature, and the mixture was stirred until generation of the hydrogen chloride stopped. Then the unreacted alcohol was removed through distillation with heating. After further distillation under reduced pressure (60° to 63° C./2 mmHg), 284 g of tetra-2,2,3,3,3-pentafluoroethoxysilane (hereinafter referred to as "5FM") was obtained.

A 300 ml three necked flask was charged with 100 g of 5FM under nitrogen atmosphere. Then a mixture of 9.75 g of ethanol, 0.835 g of a 35% aqueous solution of hydrogen chloride and 1.40 g of water was added slowly with stirring. Though white turbidity arised in the system, the stirring was continued at room temperature for one hour. Then by heating to 80° C. to about 120° C., volatile components were distilled off. A product left in the flask contained a white turbid component and its yield was 37.2 g. The obtained product is hereinafter referred to as "5F-E1".

PREPARATION EXAMPLE 10

A 300 ml three necked flask was charged with 100 g of 5FM obtained in the same manner as in Preparation Example 9 and 50.0 g of tetrahydrofuran under nitrogen atmosphere. Then a mixture of 9.75 g of ethanol, 0.835 g of a 35% aqueous solution of hydrogen chloride and 1.40 g of water was added slowly with stirring. No white turbidity arised in the system, and the stirring was continued at room temperature for one hour. Then by heating to 80° C. to about 120° C., volatile components were distilled off. Yield of a product which was left in the flask and contained, as major components, dimer, trimer and tetramer was 42.5 g (Fluorine content: 43%). The obtained product is hereinafter referred to as "5F-E2".

PREPARATION EXAMPLE 11

A 300 ml three necked flask was charged with 100 g of 5FM obtained in the same manner as in Preparation Example 9 and 20.0 g of tetrahydrofuran under nitrogen atmosphere. Then a mixture of 50.0 g of tetrahydrofuran, 0.835 g of a 35% aqueous solution of hydrogen chloride and 1.62 g of water was added slowly with stirring. The stirring was continued at room temperature for one hour. Then by heating to 80° C. to about 120° C., volatile components were distilled off. Yield of a product which was left in the flask and contained, as major components, trimer, tetramer and pentamer was 60.5 g (Fluorine content: 57%). The obtained product is hereinafter referred to as "5F-F1".

PREPARATION EXAMPLE 12

A 300 ml three necked flask was charged with 100 g of tetrabuthoxysilane and 50.0 g of tetrahydrofuran under nitrogen atmosphere. Then a mixture of 0.325 g of a 35% aqueous solution of hydrogen chloride, 4.00 g of water and 50 g of tetrahydrofuran was added slowly with stirring. The mixture solution was heated and stirred at 66° C. for five hours. Then by heating to 66° to 120° C., volatile components were distilled off. Yield of a liquid product which was left in the flask and contained, as major components, trimer, tetramer and pentamer was 65.5 g. The obtained product is hereinafter referred to as "Bu-4".

PREPARATION EXAMPLE 13

A 300 ml three necked flask was charged with 100 g of Methyl Silicate 51, 422 g of 2,2,3,3-tetrafluoropropanol and 0.040 g of sulfuric acid under nitrogen atmosphere, followed by stirring sufficiently. Then the mixture was heated and stirred at 100° C. for one hour, and further heated to 100° to 150° C. to distill off volatile components. To the crude product left in the flask was added 4.5 g of Kyowaad 500 ($Mg_6Al_2(OH)_{16}CO_3.4H_2O$ available from Kyowa Kagaku Kogyo Kabushiki Kaisha), followed by stirring at 80° C. for two hours to filtrate and remove Kyowaad 500. The obtained oligomer was a liquid product which contained, as major components, trimer to hexamer. Its yield was 181 g. The product is hereinafter referred to as "4F-35".

PREPARATION EXAMPLE 14

A 300 ml three necked flask was charged with 100 g of Methyl Silicate 56 (available from Mitsubishi Kagaku Kabushiki Kaisha, average degree of condensation: about ten), 338 g of 2,2,3,3-tetrafluoropropanol, 27.7 g of 2-ethyl-1-hexanol and 0.040 g of sulfuric acid under nitrogen atmosphere, followed by stirring sufficiently. Then the mixture was heated and stirred at 100° C. for one hour, and further heated to 100° to 170° C. to distill off volatile components. To the crude product left in the flask was added 4.5 g of Kyowaad 500. After stirring at 80° C. for two hours, Kyowaad 500 was filtrated and removed. The obtained oligomer was a liquid product which contained, as major components, octamer to dodecamer. Its yield was 176 g. The product is hereinafter referred to as "4F-H".

PREPARATION EXAMPLE 15

A 300 ml three necked flask was charged with 100 g of Methyl Silicate 56, 328 g of 2,2,3,3-tetrafluoropropanol, 100 g of 2,2,3,3,3-pentafluoropropanol, 10.0 g of polyethylene glycol monomethyl ether (Mw 550(average), available from Aldrich Co., Ltd.) and 0.040 g of sulfuric acid under nitrogen atmosphere, followed by stirring sufficiently. Then the mixture was heated and stirred at 100° C. for one hour, and further heated to 100° to 150° C. to distill off volatile components. To the crude product left in the flask was added 4.5 g of Kyowaad 500. After stirring at 80° C. for two hours, Kyowaad 500 was filtrated and removed. The obtained oligomer was a liquid product. Its yield was 194 g. The product is hereinafter referred to as "4F-PE".

The compounds obtained in the Preparation Examples are encompassed within the compound I of the present invention. The compound obtained in Preparation Example 1 has been known, and the compounds obtained in Preparation Examples 2 to 11 are novel substances.

The compound I wherein the combination of the organic groups is an alkyl having fluorine atom and $CH_3$ and/or $C_2H_5$ and n is not less than 2, is a novel substance. The compound I wherein the organic groups consist of an alkyl having fluorine atom and n is not less than 4, is also a novel substance.

PURIFICATION EXAMPLE 1

A column (diameter: 3 cm, length: 30 cm) was filled with Kyowaad 715 ($Al_2O_3.9SiO_2.XH_2O$ available from Kyowa Kagaku Kogyo Kabushiki Kaisha, Particle size: 1.5 mm), and rinsed with ethyl acetate. Then through the column was fed 500 g of the oligomer of fluorine-containing silicate obtained in Preparation Example 3, and thus the oligomer was purified. The obtained oligomer was allowed to stand at room temperature for three months, but there was no change in appearance of the oligomer. On the other hand, an oligomer which was not purified turned brown when allowed to stand at room temperature for three months.

PURIFICATION EXAMPLE 2

A column (diameter: 3 cm, length: 30 cm) was filled with Diaion SK1B (2A301)(polystyrene type cation exchange resin), treated with 2N hydrochloric acid, further rinsed with pure water and then dried. Then through the column was fed 500 g of the oligomer of fluorine-containing silicate obtained in Preparation Example 3, and thus the oligomer was purified. The obtained oligomer was allowed to stand at room temperature for three months, and there was no change in appearance of the oligomer.

EXAMPLE 1

To 208 g of Zeffle GK-500 (solid content: 60% by weight) were added 250 g of CR-95 (titanium oxide available from Ishihara Sangyo Kabushiki Kaisha), 100 g of butyl acetate and 800 g of glass beads, followed by stirring to disperse at 1,500 rpm with a portable grind mill (three blade type) for one hour. The glass beads were removed by filtration to give 429.4 g of a dispersion.

To the obtained dispersion were added 224.7 g of GK-500 and 115.4 g of butyl acetate, followed by mixing sufficiently to give a GK-500-based white paint (pigment/resin weight ratio=0.833). To 100 g of the white paint were added 30.0 g of Methyl Silicate 51 (100 parts by weight on the basis of 100 parts by weight of a fluorine-containing resin), 12.7 g of Takenate D-140N (NCO/OH=1) and 80 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 $\mu$m. Then the following tests were carried out.

The mixing components and amounts, etc. are shown in Table 1.

The tests were conducted in the manners as mentioned below.

Curability: The coating film was rubbed with butyl acetate, and evaluation was made with naked eyes in the following criteria. Curability was evaluated as "A" when there was no abnormalities, evaluated as "B" when gloss is somewhat faded and evaluated as "C" when the coating film is melted or swelled and gloss is faded.

Gloss: Specular gloss at 60° was measured according to JIS K-5400.

Pencil hardness: Measured according to JIS K-5400.

Flexibility: Measured according to JIS K-5400.

Impact strength: Du Pont's impact strength test was made according to JIS K-5400.

Stain-proofing property: Each coated plate was set on an exposure rack placed at an angle of 30° being faced toward southern direction on a roof of 4-storied building in Osaka Prefecture. Lightness (L* value) was measured after the 6-month exposure and a difference (−ΔL*) between the measured lightness and the initial lightness was assumed to be an index of the stain-proofing property. The evaluation was made by the following criteria. "A": when −ΔL* is from 0 to 3, "B": when −ΔL* is from 3 to 5, "C": when −ΔL* is from 5 to 8, "D": when −ΔL* is from 8 to 10, and "E": when −ΔL* exceeds 10.

Stain removable property: The surface of the coated plate used for the evaluation of the stain-proofing property was washed with water by a brush to eliminate stains attached thereto. The difference (−ΔL*) between the lightness (L* value) after the elimination of stains and the initial lightness was assumed to be an index of the stain removable property (Meanings of the symbols "A" to "E" are the same as above).

Pot life: The paint composition was applied after allowed to stand for a certain period of time, and a state of the applied paint and appearance of a coating film were evaluated as follows. If there occurred remarkable thickening, gellation, appearance of nibs, fading of gloss, poor sharpness of image, etc. after a lapse of time exceeding 12 hours, it was evaluated as "A". If there occurred remarkable thickening, gellation, appearance of nibs, fading of gloss, poor sharpness of image, etc. by a lapse of time of 12 hours, it was evaluated as "B". If there occurred remarkable thickening, gellation, appearance of nibs, fading of gloss, poor sharpness of image, etc. by a lapse of time of 6 hours, it was evaluated as "C". If there occurred remarkable thickening, gellation, appearance of nibs, fading of gloss, poor sharpness of image, etc. within 3 hours, it was evaluated as "D".

Compatibility: Clear coating film (conditions were the same as in Table 1 except that a pigment was not used) was evaluated with naked eyes in the manner as mentioned below. Compatibility was evaluated as "A" when the coating film was clear and free of nibs; as "B" when there was slight white turbidity or there were nibs; as "C" when there was white turbidity; and as "D" when the coating film was opaque (being turbid in white all over a surface of the film).

Accelerated weather resistance: I-Super UV tester (weather resistance tester available from Iwasaki Denki Kabushiki Kaisha) was used, and the weather resistance was evaluated by a specular gloss retention ratio (%) at 60° after a lapse of about 1,000 hours.

For the weather resistance test, the following conditions were used.

(1) Cycle LIGHT: Black panel temperature: 63° C., relative humidity: 70%, time: 11 hours, shower: 10 seconds/hour
(2) Cycle DEW: Black panel temperature: 30° C., relative humidity: 100%, time: 11 hours
(3) Cycle REST: Black panel temperature: 63° C., relative humidity: 85%, time: 1 hour The results are shown in Table 2.

EXAMPLES 2 TO 18 AND COMPARATIVE EXAMPLES 1 TO 19

A coated plate was obtained in the same manner as in Example 1 and the tests were conducted in the same manner as in Example 1 except that the mixing components and amounts, etc. in Tables 1 and 3 were employed. The results are shown in Tables 2 and 4.

TABLE 1

|  | Resin | | | Additive | | | |
| --- | --- | --- | --- | --- | --- | --- | --- |
|  | Kind | OH Value (mgKOH/g) | Acid value (mgKOH/g) | Kind | Adding amount (part by weight) | Kind of curing agent | Curing conditions[2)] |
| Ex. 1 | GK-50 | 60 | 0 | Me51 | 100 | 140N | Room temperature, 1W |
| Ex. 2 | " | " | " | " | 80 | 140N | Room temperature, 1W |
| Ex. 3 | " | " | " | " | 60 | 140N | Room temperature, 1W |
| Ex. 4 | " | " | " | " | 40 | 140N | Room temperature, 1W |
| Ex. 5 | " | " | " | " | 20 | 140N | Room temperature, 1W |

TABLE 1-continued

| | Resin | | | Additive | | | |
|---|---|---|---|---|---|---|---|
| | Kind | OH Value (mgKOH/g) | Acid value (mgKOH/g) | Kind | Adding amount (part by weight) | Kind of curing agent | Curing conditions[2] |
| Ex. 6 | " | " | " | " | 100 | 140N | Room temperature, 1W |
| Ex. 7 | " | " | " | " | 80 | 140N | Room temperature, 1W |
| Ex. 8 | " | " | " | " | 60 | 140N | Room temperature, 1W |
| Ex. 9 | " | " | " | " | 40 | 140N | Room temperature, 1W |
| Ex. 10 | " | " | " | " | 20 | 140N | Room temperature, 1W |
| Ex. 11 | GK-500/510[1] | 60 | 3 | Me51 | 80 | 140N | Room temperature, 1W |
| Ex. 12 | GK-500/510[1] | " | " | " | 60 | 140N | Room temperature, 1W |
| Ex. 13 | GK-500/510[1] | " | " | Et40 | 80 | 140N | Room temperature, 1W |
| Ex. 14 | GK-500/510[1] | " | " | " | 60 | 140N | Room temperature, 1W |
| Ex. 15 | LF-200 | 52 | 0 | Me51 | 80 | 140N | Room temperature, 1W |
| Ex. 16 | " | " | " | " | 60 | 140N | Room temperature, 1W |
| Ex. 17 | GK-500 | 60 | 0 | Me51 | 80 | HX | Room temperature, 1W |
| Ex. 18 | " | " | " | " | 60 | HX | Room temperature, 1W |

1) A mixing ratio of GR-500 to GK-510 is 7:3 (the same in the following tables).
2) "1W" stands for one week (the same in the following tables).

TABLE 2

| | Curability | Gloss (60 degrees) | Pencil hardness | Flexibility (mm) | Impact resistance (cm) | Stain-proofing property (−ΔL*) | removable property (−ΔL*) | Pot life | Compat-ibility | weather resistance (Gloss retention ratio %) |
|---|---|---|---|---|---|---|---|---|---|---|
| Ex. 1 | A | 79 | H | 2 | 100 | B | A | B | C | 94 |
| Ex. 2 | A | 78 | 2H | 2 | 100 | A | A | B | B | 90 |
| Ex. 3 | A | 81 | 2H | 2 | 100 | A | A | B | B | 94 |
| Ex. 4 | A | 76 | 2H | 2 | 100 | B | A | B | B | 92 |
| Ex. 5 | A | 81 | 2H | 2 | 100 | D | A | B | B | 92 |
| Ex. 6 | A | 81 | H | 2 | 100 | B | A | B | C | 88 |
| Ex. 7 | A | 79 | H | 2 | 100 | A | A | B | B | 94 |
| Ex. 8 | A | 82 | H | 2 | 100 | A | A | B | B | 98 |
| Ex. 9 | A | 79 | H | 2 | 100 | C | A | B | B | 91 |
| Ex. 10 | A | 84 | 2H | 2 | 100 | D | A | B | B | 91 |
| Ex. 11 | A | 79 | 2H | 2 | 100 | B | A | B | B | 93 |
| Ex. 12 | A | 76 | 2H | 2 | 100 | B | A | B | B | 89 |
| Ex. 13 | A | 84 | H | 2 | 100 | B | A | B | B | 94 |
| Ex. 14 | A | 81 | H | 2 | 100 | C | A | B | B | 97 |
| Ex. 15 | A | 82 | 2H | 6 | 40 | C | C | B | B | 98 |
| Ex. 16 | A | 79 | 2H | 6 | 40 | D | B | B | B | 92 |
| Ex. 17 | A | 68 | H | 2 | 100 | B | B | B | B | 94 |
| Ex. 18 | A | 65 | H | 2 | 100 | B | A | B | B | 93 |

Stain           Accelerated

TABLE 3

| | Resin | | | Additive | | | |
|---|---|---|---|---|---|---|---|
| | Kind | OH Value (mgKOH/g) | Acid value (mgKOH/g) | Kind | Adding amount (part by weight) | Kind of curing agent | Curing conditions |
| Com. Ex. 1 | GK-500 | 60 | 0 | Me39 | 100 | 140N | Room temperature, 1W |
| Com. Ex. 2 | " | " | " | " | 80 | 140N | Room temperature, 1W |
| Com. Ex. 3 | " | " | " | " | 60 | 140N | Room temperature, 1W |
| Com. Ex. 4 | " | " | " | " | 40 | 140N | Room temperature, 1W |
| Com. Ex. 5 | " | " | " | " | 20 | 140N | Room temperature, 1W |
| Com. Ex. 6 | " | " | " | " | 0 | 140N | Room temperature, 1W |
| Com. Ex. 7 | " | " | " | Et28 | 100 | 140N | Room temperature, 1W |
| Com. Ex. 8 | " | " | " | " | 80 | 140N | Room temperature, 1W |
| Com. Ex. 9 | " | " | " | " | 60 | 140N | Room temperature, 1W |
| Com. Ex. 10 | " | " | " | " | 40 | 140N | Room temperature, 1W |
| Com. Ex. 11 | " | " | " | " | 20 | 140N | Room temperature, 1W |
| Com. Ex. 12 | " | " | " | HAS-1 | 267 | 140N | Room temperature, 1W |
| Com. Ex. 13 | " | " | " | " | 200 | 140N | Room temperature, 1W |

TABLE 3-continued

| | Resin | | | Additive | | |
|---|---|---|---|---|---|---|
| | Kind | OH Value (mgKOH/g) | Acid value (mgKOH/g) | Kind | Adding amount (part by weight) | Kind of curing agent | Curing conditions |
| Com. Ex. 14 | " | " | " | " | 267 | None | Room temperature, 1W |
| Com. Ex. 15 | " | " | " | " | 200 | None | Room temperature, 1W |
| Com. Ex. 16 | " | " | " | Me51 | 80 | None | Room temperature, 1W |
| Com. Ex. 17 | " | " | " | " | 60 | None | Room temperature, 1W |
| Com. Ex. 18 | GK-500/510 | " | 3 | " | 80 | 0.3 | 140° C., 30 minutes |
| Com. Ex. 19 | GK-500/510 | " | " | " | " | None | 140° C., 30 minutes |

TABLE 4

| | Curability | Gloss (60 degrees) | Pencil hardness | Flexibility (mm) | Impact resistance (cm) |
|---|---|---|---|---|---|
| Com. Ex. 1 | A | 81 | H | 2 | 100 |
| Com. Ex. 2 | A | 86 | 2H | 2 | 100 |
| Com. Ex. 3 | A | 78 | 2H | 2 | 100 |
| Com. Ex. 4 | A | 80 | 2H | 2 | 100 |
| Com. Ex. 5 | A | 78 | 2H | 2 | 100 |
| Com. Ex. 6 | A | 86 | 2H | 2 | 100 |
| Com. Ex. 7 | A | 82 | H | 2 | 100 |
| Com. Ex. 8 | A | 78 | H | 2 | 100 |
| Com. Ex. 9 | A | 81 | H | 2 | 100 |
| Com. Ex. 10 | A | 79 | 2H | 2 | 100 |
| Com. Ex. 11 | A | 83 | 2H | 2 | 100 |
| Com. Ex. 12 | B | 82 | B | 2 | 100 |
| Com. Ex. 13 | B | 80 | B | 2 | 100 |
| Com. Ex. 14 | C | — | — | — | — |
| Com. Ex. 15 | C | — | — | — | — |
| Com. Ex. 16 | C | — | — | — | — |
| Com. Ex. 17 | C | — | — | — | — |
| Com. Ex. 18 | A | 82 | 2H | 2 | 100 |
| Com. Ex. 19 | A | 82 | 2H | 2 | 100 |

| | Stain-proofing property (−ΔL*) | Stain removable property (−ΔL*) | Pot life | Compatibility | Accelerated weather resistance (Gloss retention ratio %) |
|---|---|---|---|---|---|
| Com. Ex. 1 | C | A | B | B | 91 |
| Com. Ex. 2 | D | A | B | A | 92 |
| Com. Ex. 3 | E | A | B | A | 91 |
| Com. Ex. 4 | E | A | B | A | 94 |
| Com. Ex. 5 | E | A | B | A | 89 |
| Com. Ex. 6 | E | A | B | A | 93 |
| Com. Ex. 7 | E | B | B | B | 91 |
| Com. Ex. 8 | D | A | B | A | 92 |
| Com. Ex. 9 | E | A | B | A | 89 |
| Com. Ex. 10 | E | A | B | A | 93 |
| Com. Ex. 11 | E | A | B | A | 94 |
| Com. Ex. 12 | E | C | D | A | 51 |
| Com. Ex. 13 | D | B | D | A | 60 |
| Com. Ex. 14 | — | — | — | — | — |
| Com. Ex. 15 | — | — | — | — | — |
| Com. Ex. 16 | — | — | — | — | — |
| Com. Ex. 17 | — | — | — | — | — |
| Com. Ex. 18 | E | A | B | B | 92 |
| Com. Ex. 19 | E | A | B | B | 91 |

EXAMPLE 19

To 100 g of the GK-500-based white paint prepared in the same manner as in Example 1 except that the mixing components and amounts, etc. in Table 5 were employed, were added 30.0 g of 3F-54 (100 parts by weight on the basis of 100 parts by weight of a fluorine-containing resin), 12.7 g of Takenate D-140N (NCO/OH=1) and 80.0 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the same tests as in Example 1 were carried out.

A test of intercoat adhesion of repair coatings was conducted in the following manner.

Intercoat adhesion of repair coatings: A coated plate produced under the conditions shown in Table 5 was cured at 170° C. for one hour and further treated under the conditions of 40° C. and 90% of relative humidity. Then the same paint was applied thereon and cured under the conditions shown in Table 5. With respect to the obtained coated plate, Cross Cut Test of the coating film was conducted. Namely, a surface of the coating film was cut by a cutter so that a surface of the coating film was cut to 100 pieces of squares. Then an adhesive tape was applied on the cut square films and peeled off quickly. The number of remaining films was counted and indicated as "(Remaining square films)/100" to evaluate adhesion between coating films. The results are shown in Table 6.

EXAMPLES 20 TO 43

A coated plate was obtained in the same manner as in Example 19 except that the mixing components and amounts, etc. shown in Table 5 were employed. The same tests as in Example 19 were conducted. The results are shown in Table 6.

TABLE 5

| | Resin | | | | Additive | | | | |
|---|---|---|---|---|---|---|---|---|---|
| | Kind | OH Value (mgKOH/g) | Acid value (mgKOH/g) | Fluorine content (%, based on resin) | Kind | Adding amount (part by weight) | Kind of curing agent | Curing conditions | Isopropanol (part by weight) |
| Ex. 19 | GK-500 | 60 | 0 | 35 | 3F-54 | 100 | 140N | Room temperature, 1W | 0 |
| Ex. 20 | " | " | " | " | " | 50 | 140N | Room temperature, 1W | 0 |
| Ex. 21 | " | " | " | " | " | 20 | 140N | Room temperature, 1W | 0 |
| Ex. 22 | " | " | " | " | " | 10 | 140N | Room temperature, 1W | 0 |
| Ex. 23 | " | " | " | " | 3F-41 | 50 | 140N | Room temperature, 1W | 0 |
| Ex. 24 | " | " | " | " | " | 20 | 140N | Room temperature, 1W | 0 |
| Ex. 25 | " | " | " | " | " | 10 | 140N | Room temperature, 1W | 0 |
| Ex. 26 | " | " | " | " | " | 5 | 140N | Room temperature, 1W | 0 |
| Ex. 27 | " | " | " | " | " | 1 | 140N | Room temperature, 1W | 0 |
| Ex. 28 | " | " | " | " | 5F-21 | 50 | 140N | Room temperature, 1W | 0 |
| Ex. 29 | " | " | " | " | " | 20 | 140N | Room temperature, 1W | 0 |
| Ex. 30 | " | " | " | " | 5F-46 | 50 | 140N | Room temperature, 1W | 0 |
| Ex. 31 | " | " | " | " | " | 20 | 140N | Room temperature, 1W | 0 |
| Ex. 32 | " | " | " | " | " | 10 | 140N | Room temperature, 1W | 0 |
| Ex. 33 | " | " | " | " | " | 5 | 140N | Room temperature, 1W | 0 |
| Ex. 34 | " | " | " | " | " | 1 | 140N | Room temperature, 1W | 0 |
| Ex. 35 | " | " | " | " | 9F-42 | 50 | 140N | Room temperature, 1W | 0 |
| Ex. 36 | " | " | " | " | " | 20 | 140N | Room temperature, 1W | 0 |
| Ex. 37 | " | " | " | " | " | 10 | 140N | Room temperature, 1W | 0 |
| Ex. 38 | " | " | " | " | " | 5 | 140N | Room temperature, 1W | 0 |
| Ex. 39 | " | " | " | " | " | 1 | 140N | Room temperature, 1W | 0 |
| Ex. 40 | " | " | " | " | 9F-52 | 20 | 140N | Room temperature, 1W | 0 |
| Ex. 41 | " | " | " | " | " | 10 | 140N | Room temperature, 1W | 0 |
| Ex. 42 | " | " | " | " | 17F-42 | 10 | 140N | Room temperature, 1W | 0 |
| Ex. 43 | " | " | " | " | 17F-53 | 10 | 140N | Room temperature, 1W | 0 |

TABLE 6

| | Curability | Gloss | Pencil hardness | Flexibility (mm) | Impact resistance (cm) | Stain-proofing property (−ΔL*) |
|---|---|---|---|---|---|---|
| Ex. 19 | A | 81 | 2H | 2 | 100 | C |
| Ex. 20 | A | 86 | 2H | 2 | 100 | C |
| Ex. 21 | A | 79 | 2H | 2 | 100 | C |
| Ex. 22 | A | 82 | 2H | 2 | 100 | D |
| Ex. 23 | A | 85 | H | 2 | 100 | A |
| Ex. 24 | A | 84 | 2H | 2 | 100 | A |
| Ex. 25 | A | 86 | 2H | 2 | 100 | A |
| Ex. 26 | A | 84 | 2H | 2 | 100 | A |
| Ex. 27 | A | 82 | 2H | 2 | 100 | A |
| Ex. 28 | A | 85 | H | 2 | 100 | B |
| Ex. 29 | A | 85 | 2H | 2 | 100 | D |
| Ex. 30 | A | 82 | 2H | 2 | 100 | A |
| Ex. 31 | A | 87 | 2H | 2 | 100 | A |
| Ex. 32 | A | 85 | 2H | 2 | 100 | A |
| Ex. 33 | A | 86 | 2H | 2 | 100 | A |
| Ex. 34 | A | 83 | 2H | 2 | 100 | A |
| Ex. 35 | A | 83 | H | 2 | 100 | A |
| Ex. 36 | A | 84 | 2H | 2 | 100 | B |
| Ex. 37 | A | 87 | 2H | 2 | 100 | B |
| Ex. 38 | A | 87 | 2H | 2 | 100 | B |

TABLE 6-continued

| | | | | | | |
|---|---|---|---|---|---|---|
| Ex. 39 | A | 81 | 2H | 2 | 100 | C |
| Ex. 40 | A | 85 | 2H | 2 | 100 | C |
| Ex. 41 | A | 87 | 2H | 2 | 100 | C |
| Ex. 42 | A | 82 | 2H | 2 | 100 | C |
| Ex. 43 | A | 83 | 2H | 2 | 100 | D |

| | Stain removable property (-ΔL*) | Intercoat adhesion of repair coatings | Pot life | Compatibility (with naked eyes) | Accelerated weather resistance (Gloss retention ratio %) |
|---|---|---|---|---|---|
| Ex. 19 | A | 100/100 | B | B | 91 |
| Ex. 20 | A | 100/100 | B | B | 92 |
| Ex. 21 | A | 100/100 | B | B | 92 |
| Ex. 22 | A | 100/100 | B | A | 90 |
| Ex. 23 | A | 100/100 | B | B | 95 |
| Ex. 24 | A | 100/100 | B | B | 98 |
| Ex. 25 | A | 100/100 | B | A | 97 |
| Ex. 26 | A | 100/100 | B | A | 95 |
| Ex. 27 | A | 100/100 | B | A | 92 |
| Ex. 28 | A | 100/100 | B | A | 98 |
| Ex. 29 | A | 100/100 | B | A | 98 |
| Ex. 30 | A | 100/100 | B | C | 94 |
| Ex. 31 | A | 100/100 | B | B | 92 |
| Ex. 32 | A | 100/100 | B | A | 95 |
| Ex. 33 | A | 100/100 | B | A | 97 |
| Ex. 34 | A | 100/100 | B | A | 90 |
| Ex. 35 | A | 100/100 | B | C | 94 |
| Ex. 36 | A | 100/100 | B | B | 95 |
| Ex. 37 | A | 100/100 | B | B | 94 |
| Ex. 38 | A | 100/100 | B | A | 94 |
| Ex. 39 | A | 100/100 | B | A | 93 |
| Ex. 40 | A | 100/100 | B | B | 95 |
| Ex. 41 | A | 100/100 | B | B | 92 |
| Ex. 42 | A | 100/100 | B | B | 96 |
| Ex. 43 | A | 100/100 | B | B | 95 |

EXAMPLE 44

To 100 g of the GK-500/510(7/3)-based white paints prepared in the same manner as in Example 1 except that the mixing components and amounts, etc. in Table 7 were employed, were added 6.0 g of 3F-41 (20 parts by weight on the basis of 100 parts of a fluorine-containing resin), 12.7 g of Takenate D-140N (NCO/OH=1) and 80.0 g of butyl acetate, followed by mixing sufficiently. The obtained paint composition was applied to a dull-finished steel plate (0.5 mm thick) by spray coating, dried and cured at 80° C. for three hours to give a coated plate having a coating thickness of about 40 μm. Then the same tests as in Example 19 were carried out. The results are shown in Table 8.

EXAMPLES 45 TO 60

A coated plate was obtained in the same manner as in Example 44 except that the mixing components and amounts, etc. shown in Table 7 were employed. The same tests as in Example 19 were conducted. The results are shown in Table 8.

EXAMPLE 61

As shown in Table 7, to 250 g of Gemlac YC3623 (solid content: 50%) were added 250 g of CR-95 (titanium oxide available from Ishihara Sangyo Kabushiki Kaisha), 100 g of butyl acetate, 10 g of $HC(OCH_3)_3$ as a dehydrating agent and 800 g of glass beads, followed by stirring to disperse at 1,500 rpm for one hour with a portable grind mill (three blade type). The glass beads were removed by filtration to give 440.1 g of a dispersion. To the obtained dispersion were added 256.7 g of YC3623 and 36.7 g of butyl acetate, followed by mixing sufficiently to give a YC3623-based white paint (pigment/resin weight ratio=0.833). To 100 g of the white paint were added 6.0 g of 3F-41 (20 parts by weight on the basis of 100 parts by weight of an acrylic silicon resin), 0.15 g of 1% solution of dibutyltindilaurate in butyl acetate and 80 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the same tests as in Example 19 were carried out. The results are shown in Table 8.

EXAMPLES 62 TO 65

A coated plate was obtained in the same manner as in Example 61 except that the mixing components and amounts, etc. shown in Table 7 were employed. The same tests as in Example 19 were conducted. The results are shown in Table 8.

TABLE 7

| | Resin | | | | Additive | | | | |
| --- | --- | --- | --- | --- | --- | --- | --- | --- | --- |
| | Kind | OH Value (mgKOH/g) | Acid value (mgKOH/g) | Fluorine content (%, based on resin) | Kind | Adding amount (part by weight) | Kind of curing agent | Curing conditions | Isopropanol (part by weight) |
| Ex. 44 | GK-500/510 | 60 | 3 | 35 | 3F-41 | 20 | 140N | 80° C., 3 hours | 0 |
| Ex. 45 | GK-500/510 | " | " | " | " | 10 | 140N | 80° C., 3 hours | 0 |
| Ex. 46 | GK-500/510 | " | " | " | 5F-21 | 20 | 140N | 80° C., 3 hours | 0 |
| Ex. 47 | GK-500/510 | " | " | " | " | 10 | 140N | 80° C., 3 hours | 0 |
| Ex. 48 | GK-500/510 | " | " | " | 5F-46 | 20 | 140N | 80° C., 3 hours | 0 |
| Ex. 49 | GK-500/510 | " | " | " | " | 10 | 140N | 80° C., 3 hours | 0 |
| Ex. 50 | GK-500/510 | " | " | " | 9F-42 | 20 | 140N | 80° C., 3 hours | 0 |
| Ex. 51 | GK-500/510 | " | " | " | " | 10 | 140N | 80° C., 3 hours | 0 |
| Ex. 52 | LF-200 | 52 | 0 | 27 | 3F-41 | 20 | 140N | Room temperature, 1W | 0 |
| Ex. 53 | " | " | " | " | " | 10 | 140N | Room temperature, 1W | 0 |
| Ex. 54 | " | " | " | " | 5F-46 | 20 | 140N | Room temperature, 1W | 0 |
| Ex. 55 | " | " | " | " | " | 10 | 140N | Room temperature, 1W | 0 |
| Ex. 56 | A-801 | 100 | <6 | 0 | 3F-41 | 20 | 140N | Room temperature, 1W | 0 |
| Ex. 57 | " | " | " | " | " | 5 | 140N | Room temperature, 1W | 0 |
| Ex. 58 | " | " | " | " | 5F-46 | 20 | 140N | Room temperature, 1W | 0 |
| Ex. 59 | " | " | " | " | " | 5 | 140N | Room temperature, 1W | 0 |
| Ex. 60 | " | " | " | " | " | 0 | 140N | Room temperature, 1W | 0 |
| Ex. 61 | YC3623 | — | — | 0 | 3F-41 | 20 | Sn | Room temperature, 1W | 0 |
| Ex. 62 | " | " | " | " | " | 5 | Sn | Room temperature, 1W | 0 |
| Ex. 63 | " | " | " | " | 5F-46 | 20 | Sn | Room temperature, 1W | 0 |
| Ex. 64 | " | " | " | " | " | 5 | Sn | Room temperature, 1W | 0 |
| Ex. 65 | " | " | " | " | " | 0 | Sn | Room temperature, 1W | 0 |

TABLE 8

| | Curability | Gloss | Pencil hardness | Flexibility (mm) | Impact resistance (cm) | Stain-proofing property (-ΔL*) |
| --- | --- | --- | --- | --- | --- | --- |
| Ex. 44 | A | 86 | 2H | 2 | 100 | A |
| Ex. 45 | A | 85 | 2H | 2 | 100 | A |
| Ex. 46 | A | 85 | 2H | 2 | 100 | C |
| Ex. 47 | A | 83 | 2H | 2 | 100 | D |
| Ex. 48 | A | 87 | 2H | 2 | 100 | A |
| Ex. 49 | A | 85 | 2H | 2 | 100 | A |
| Ex. 50 | A | 87 | 2H | 2 | 100 | B |
| Ex. 51 | A | 84 | 2H | 2 | 100 | B |
| Ex. 52 | A | 85 | 2H | 6 | 40 | B |
| Ex. 53 | A | 86 | 2H | 6 | 40 | C |
| Ex. 54 | A | 87 | 2H | 6 | 40 | B |
| Ex. 55 | A | 84 | 2H | 6 | 40 | C |
| Ex. 56 | A | 91 | 2H | 10 | 20 | B |
| Ex. 57 | A | 89 | 2H | 10 | 20 | B |
| Ex. 58 | A | 90 | 2H | 10 | 20 | C |
| Ex. 59 | A | 94 | 2H | 10 | 20 | C |
| Ex. 60 | A | 91 | 2H | 10 | 20 | E |
| Ex. 61 | A | 90 | 2H | 6 | 40 | A |
| Ex. 62 | A | 92 | 2H | 6 | 40 | B |
| Ex. 63 | A | 88 | 2H | 6 | 40 | A |
| Ex. 64 | A | 89 | 2H | 6 | 40 | B |
| Ex. 65 | A | 89 | 2H | 2 | 80 | D |

| | Stain removable property (-ΔL*) | Intercoat adhesion of repair coatings | Pot life | Compatibility (with naked eyes) | Accelerated weather resistance (Gloss retention ratio %) |
| --- | --- | --- | --- | --- | --- |
| Ex. 44 | A | 100/100 | B | B | 94 |
| Ex. 45 | A | 100/100 | B | B | 96 |
| Ex. 46 | A | 100/100 | B | B | 97 |

TABLE 8-continued

| | | | | | |
|---|---|---|---|---|---|
| Ex. 47 | A | 100/100 | B | B | 97 |
| Ex. 48 | A | 100/100 | B | B | 95 |
| Ex. 49 | A | 100/100 | B | B | 98 |
| Ex. 50 | A | 100/100 | B | B | 97 |
| Ex. 51 | A | 100/100 | B | B | 96 |
| Ex. 52 | A | 100/100 | B | C | 98 |
| Ex. 53 | A | 100/100 | B | B | 94 |
| Ex. 54 | A | 100/100 | B | C | 92 |
| Ex. 55 | A | 100/100 | B | B | 97 |
| Ex. 56 | A | 100/100 | B | C | 20 |
| Ex. 57 | A | 100/100 | B | B | 14 |
| Ex. 58 | A | 100/100 | B | C | 17 |
| Ex. 59 | A | 100/100 | B | B | 31 |
| Ex. 60 | B | 0/100 | B | — | 21 |
| Ex. 61 | A | 100/100 | B | B | 80 |
| Ex. 62 | A | 100/100 | B | B | 75 |
| Ex. 63 | A | 100/100 | B | B | 81 |
| Ex. 64 | A | 100/100 | B | B | 76 |
| Ex. 65 | B | 60/100 | B | — | 82 |

EXAMPLE 66

As shown in Table 9, to 100 g of Ecolton A-3 were added 20.0 g of 3F-41 and further 10 g of a specific curing agent for the resin and 20.0 g of butyl acetate, followed by mixing sufficiently. The obtained paint composition (clear) was applied to a dull-finished steel plate (0.5 mm thick, GK-500-based white/Takenate D-140N had been previously applied thereon) by spray coating, dried and cured at room temperature for one week to give a coated plate having a coating thickness of about 40 µm. Then the same tests as in Example 19 were carried out. The results are shown in Table 10.

EXAMPLES 67 TO 70

A coated plate was obtained in the same manner as in Example 66 except that the mixing components and amounts, etc. shown in Table 9 were employed. The same tests as in Example 19 were conducted. The results are shown in Table 10.

EXAMPLE 71

As shown in Table 9, to 100 g of GK-500-based white paint prepared in the same manner as in Example 1 were added 15.0 g of 3F-41 (50 parts by weight on the basis of 100 parts by weight of a fluorine-containing resin), 6.33 g of Coronate HX (NCO/OH=1) and 80.0 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 µm. Then the same tests as in Example 19 were carried out. The results are shown in Table 10.

EXAMPLES 72 TO 85

A coated plate was obtained in the same manner as in Example 71 except that the mixing components and amounts, etc. shown in Table 9 were employed. The same tests as in Example 19 were conducted. The results are shown in Table 10.

TABLE 9

| | Resin | | | | Additive | | | |
|---|---|---|---|---|---|---|---|---|
| | Kind | OH Value (mgKOH/g) | Acid value (mgKOH/g) | Fluorine content (%, based on resin) | Kind | Adding amount (part by weight) | Kind of curing agent | Curing conditions | Isopropanol (part by weight) |
| Ex. 66 | A-3 | — | — | 0 | 3F-41 | 20 | Specific curing agent | Room temperature, 1W | 0 |
| Ex. 67 | " | " | " | " | " | 5 | Specific curing agent | Room temperature, 1W | 0 |
| Ex. 68 | " | " | " | " | 5F-46 | 20 | Specific curing agent | Room temperature, 1W | 0 |
| Ex. 69 | " | " | " | " | " | 5 | Specific curing agent | Room temperature, 1W | 0 |
| Ex. 70 | " | " | " | " | " | 0 | Specific curing agent | Room temperature, 1W | 0 |
| Ex. 71 | GK-500 | 60 | 0 | 35 | 3F-41 | 50 | HX | Room temperature, 1W | 0 |
| Ex. 72 | " | " | " | " | " | 20 | HX | Room temperature, 1W | 0 |
| Ex. 73 | " | " | " | " | " | 10 | HX | Room temperature, 1W | 0 |

TABLE 9-continued

| | Resin | | | | Additive | | | | |
|---|---|---|---|---|---|---|---|---|---|
| | Kind | OH Value (mgKOH/g) | Acid value (mgKOH/g) | Fluorine content (%, based on resin) | Kind | Adding amount (part by weight) | Kind of curing agent | Curing conditions | Isopropanol (part by weight) |
| Ex. 74 | " | " | " | " | 5F-46 | 50 | HX | Room temperature, 1W | 0 |
| Ex. 75 | " | " | " | " | " | 20 | HX | Room temperature, 1W | 0 |
| Ex. 76 | " | " | " | " | " | 10 | HX | Room temperature, 1W | 0 |
| Ex. 77 | " | " | " | " | 9F-42 | 50 | HX | Room temperature, 1W | 0 |
| Ex. 78 | " | " | " | " | " | 20 | HX | Room temperature, 1W | 0 |
| Ex. 79 | " | " | " | " | " | 10 | HX | Room temperature, 1W | 0 |
| Ex. 80 | GK-500 | 60 | 0 | 34 | 5F-46 | 20 | 140N | Room temperature, 1W | 100 |
| Ex. 81 | " | " | " | " | " | 20 | 140N | Room temperature, 1W | 50 |
| Ex. 82 | " | " | " | " | " | 20 | 140N | Room temperature, 1W | 10 |
| Ex. 83 | " | " | " | " | " | 20 | 140N | Room temperature, 1W | 5 |
| Ex. 84 | " | " | " | " | " | 20 | 140N | Room temperature, 1W | 3 |
| Ex. 85 | " | " | " | " | " | 20 | 140N | Room temperature, 1W | 1 |

TABLE 10

| | Curability | Gloss | Pencil hardness | Flexibility (mm) | Impact resistance (cm) | Stain-proofing property ($-\Delta L^*$) |
|---|---|---|---|---|---|---|
| Ex. 66 | A | 94 | 2H | 2 | 100 | B |
| Ex. 67 | A | 95 | 2H | 2 | 100 | B |
| Ex. 68 | A | 93 | 2H | 2 | 100 | A |
| Ex. 69 | A | 94 | 2H | 2 | 100 | E |
| Ex. 70 | A | 94 | 2H | 2 | 100 | E |
| Ex. 71 | A | 83 | H | 2 | 100 | A |
| Ex. 72 | A | 85 | H | 2 | 100 | B |
| Ex. 73 | A | 84 | H | 2 | 100 | B |
| Ex. 74 | A | 70 | H | 2 | 100 | B |
| Ex. 75 | A | 86 | H | 2 | 100 | B |
| Ex. 76 | A | 86 | H | 2 | 100 | B |
| Ex. 77 | A | 71 | H | 2 | 100 | B |
| Ex. 78 | A | 86 | H | 2 | 100 | C |
| Ex. 79 | A | 85 | H | 2 | 100 | B |
| Ex. 80 | B | 70 | B | 2 | 100 | C |
| Ex. 81 | B | 74 | HB | 2 | 100 | B |
| Ex. 82 | A | 82 | H | 2 | 100 | A |
| Ex. 83 | A | 79 | 2H | 2 | 100 | A |
| Ex. 84 | A | 83 | 2H | 2 | 100 | A |
| Ex. 85 | A | 84 | 2H | 2 | 100 | A |

| | Stain removable property ($-\Delta L^*$) | Intercoat adhesion of repair coatings | Pot life | Compatibility (with naked eyes) | Accelerated weather resistance (Gloss retention ratio %) |
|---|---|---|---|---|---|
| Ex. 66 | A | 100/100 | B | C | 94 |
| Ex. 67 | A | 100/100 | B | B | 95 |
| Ex. 68 | A | 100/100 | B | C | 92 |
| Ex. 69 | A | 100/100 | B | B | 94 |
| Ex. 70 | A | 0/100 | B | — | 94 |
| Ex. 71 | A | 100/100 | B | B | 94 |
| Ex. 72 | B | 100/100 | B | B | 94 |
| Ex. 73 | A | 100/100 | B | B | 95 |
| Ex. 74 | A | 100/100 | B | C | 90 |
| Ex. 75 | A | 100/100 | B | B | 97 |
| Ex. 76 | A | 100/100 | B | B | 96 |
| Ex. 77 | A | 100/100 | B | C | 92 |
| Ex. 78 | A | 100/100 | B | B | 96 |
| Ex. 79 | A | 100/100 | B | B | 98 |
| Ex. 80 | B | 100/100 | D | B | 45 |
| Ex. 81 | B | 100/100 | D | B | 52 |
| Ex. 82 | A | 100/100 | B | A | 92 |
| Ex. 83 | A | 100/100 | B | A | 91 |

TABLE 10-continued

| | | | | | | |
|---|---|---|---|---|---|---|
| Ex. 84 | A | 100/100 | B | A | | 94 |
| Ex. 85 | A | 100/100 | B | A | | 87 |

EXAMPLES 86

As shown in Table 11, to 100 g of GK-500-based white paint prepared in the same manner as in Example 1 were added 15.0 g of 3F-41, 16.6 g of BL-4165, 0.075 g of 1% solution of dibutyltindilaurate in butyl acetate and 80.0 g of butyl acetate, followed by mixing sufficiently. The obtained paint composition was applied to a dull-finished steel plate (0.5 mm thick) by spray coating, subjected to setting for about 20 minutes, heated and cured at 170° C. for 30 minutes to give a coated plate having a coating thickness of about 40 μm. Then the same tests as in Example 19 were carried out. The results are shown in Table 12.

EXAMPLES 87 TO 94

A coated plate was obtained in the same manner as in Example 86 except that the mixing components and amounts, etc. shown in Table 11 were employed. The same tests as in Example 19 were conducted. The results are shown in Table 12.

EXAMPLE 95

As shown in Table 11, to 100 g of GK-500-based white paint prepared in the same manner as in Example 1 were added 6.00 g of 9F-42, 5.29 g of Cymel 303, 0.15 g of 50% solution of para-toluenesulfonic acid in butyl acetate and 80.0 g of butyl acetate, followed by mixing sufficiently. The obtained paint composition was applied to a dull-finished steel plate (0.5 mm thick) by spray coating, subjected to setting for about 20 minutes, heated and cured at 120° C. for 30 minutes to give a coated plate having a coating thickness of about 40 μm. Then the same tests as in Example 19 were carried out. The results are shown in Table 12.

EXAMPLES 96 TO 98

A coated plate was obtained in the same manner as in Example 95 except that the mixing components and amounts, etc. shown in Table 11 were employed. The same tests as in Example 19 were conducted. The results are shown in Table 12.

COMPARATIVE EXAMPLES 20 TO 25

A coated plate was obtained in the same manner as in Example 1 except that the mixing components and amounts, etc. shown in Table 11 were employed. The same tests as in Example 19 were conducted. The results are shown in Table 12.

TABLE 11

| | Resin | | | | Additive | | | |
|---|---|---|---|---|---|---|---|---|
| | Kind | OH Value (mgKOH/g) | Acid value (mgKOH/g) | Fluorine content (%, based on resin) | Kind | Adding amount (part by weight) | Kind of curing agent | Curing conditions | Isopropanol (part by weight) |
| Ex. 86 | GK-500 | 60 | 0 | 35 | 3F-41 | 50 | 4165 | 170° C., 30 minutes | 0 |
| Ex. 87 | " | " | " | " | " | 20 | 4165 | 170° C., 30 minutes | 0 |
| Ex. 88 | " | " | " | " | " | 10 | 4165 | 170° C., 30 minutes | 0 |
| Ex. 89 | " | " | " | " | " | 50 | 4165 | 170° C., 30 minutes | 50 |
| Ex. 90 | " | " | " | " | " | 50 | 4165 | 170° C., 30 minutes | 10 |
| Ex. 91 | " | " | " | " | " | 50 | 4165 | 170° C., 30 minutes | 5 |
| Ex. 92 | " | " | " | " | " | 50 | 4165 | 170° C., 30 minutes | 3 |
| Ex. 93 | " | " | " | " | 5F-46 | 20 | 4165 | 170° C., 30 minutes | 0 |
| Ex. 94 | " | " | " | " | " | 10 | 4165 | 170° C., 30 minutes | 0 |
| Ex. 95 | " | " | " | " | 9F-42 | 20 | 303 | 170° C., 30 minutes | 0 |
| Ex. 96 | " | " | " | " | " | 10 | 303 | 170° C., 30 minutes | 0 |
| Ex. 97 | " | " | " | " | 9F-52 | 20 | 303 | 170° C., 30 minutes | 0 |
| Ex. 98 | " | " | " | " | " | 10 | 303 | 170° C., 30 minutes | 0 |
| Com. Ex. 20 | GK-500 | 60 | 0 | 35 | — | 0 | 140N | Room temperature, 1W | 0 |
| Com. Ex. 21 | " | " | " | " | 3F-41 | 100 | None | Room temperature, 1W | 0 |
| Com. Ex. 22 | " | " | " | " | " | 5 | None | Room temperature, 1W | 0 |
| Com. Ex. 23 | GK-500 /510 | 60 | 3 | 35 | 5F-46 | 100 | None | Room temperature, 1W | 0 |
| Com. Ex. 24 | " | " | " | " | " | 50 | None | Room temperature, 1W | 0 |
| Com. Ex. 25 | " | " | " | " | 3F-41 | 50 | None | 140° C., 30 minutes | 0 |

TABLE 12

| | Curability | Gloss | Pencil hardness | Flexibility (mm) | Impact resistance (cm) | Stain-proofing property (-ΔL*) |
|---|---|---|---|---|---|---|
| Ex. 86 | A | 68 | 2H | 2 | 100 | B |
| Ex. 87 | A | 83 | 2H | 2 | 100 | B |
| Ex. 88 | A | 84 | 2H | 2 | 100 | A |
| Ex. 89 | A | 82 | 2H | 2 | 100 | A |
| Ex. 90 | A | 83 | 2H | 2 | 100 | A |
| Ex. 91 | A | 79 | 2H | 2 | 100 | A |
| Ex. 92 | A | 81 | 2H | 2 | 100 | A |
| Ex. 93 | A | 85 | 2H | 2 | 100 | A |
| Ex. 94 | A | 86 | 2H | 2 | 100 | A |
| Ex. 95 | A | 86 | 2H | 4 | 100 | B |
| Ex. 96 | A | 83 | 2H | 4 | 100 | A |
| Ex. 97 | A | 84 | 2H | 4 | 100 | C |
| Ex. 98 | A | 83 | 2H | 4 | 100 | C |
| Com. Ex. 20 | A | 86 | 2H | 2 | 100 | E |
| Com. Ex. 21 | C | — | — | — | — | — |
| Com. Ex. 22 | C | — | — | — | — | — |
| Com. Ex. 23 | C | — | — | — | — | — |
| Com. Ex. 24 | C | — | — | — | — | — |
| Com. Ex. 25 | A | 87 | 2H | 2 | 100 | A |

| | Stain removable property (-ΔL*) | Intercoat adhesion of repair coatings | Pot life | Compatibility (with naked eyes) | Accelerated weather resistance (Gloss retention ratio %) |
|---|---|---|---|---|---|
| Ex. 86 | A | 100/100 | A | B | 92 |
| Ex. 87 | A | 100/100 | A | B | 94 |
| Ex. 88 | A | 100/100 | A | B | 97 |
| Ex. 89 | A | 100/100 | A | A | 92 |
| Ex. 90 | A | 100/100 | A | A | 93 |
| Ex. 91 | A | 100/100 | A | A | 89 |
| Ex. 92 | A | 100/100 | A | A | 91 |
| Ex. 93 | A | 100/100 | A | B | 94 |
| Ex. 94 | A | 100/100 | A | B | 96 |
| Ex. 95 | A | 100/100 | A | B | 95 |
| Ex. 96 | A | 100/100 | A | B | 94 |
| Ex. 97 | A | 100/100 | A | B | 91 |
| Ex. 98 | A | 100/100 | A | B | 97 |
| Com. Ex. 20 | A | 60/100 | B | — | 93 |
| Com. Ex. 21 | — | — | — | — | — |
| Com. Ex. 22 | — | — | — | — | — |
| Com. Ex. 23 | — | — | — | — | — |
| Com. Ex. 24 | — | — | — | — | — |
| Com. Ex. 25 | A | 100/100 | B | B | 91 |

EXAMPLE 99

To 208 g of Zeffle GK-500 (solid content: 60% by weight) were added 250 g of CR-95 (titanium oxide available from Ishihara Sangyo Kabushiki Kaisha), 100 g of butyl acetate and 800 g of glass beads, followed by stirring to disperse at 1,500 rpm for one hour with a portable grind mill (three blade type). The glass beads were removed by filtration to give 405.5 g of a dispersion. To the obtained dispersion were added 209.6 g of GK-500 and 107.6 g of butyl acetate, followed by mixing sufficiently to give a GK-500-based white paint (pigment/ resin weight ratio=0.833). To 100 g of the white paint were added 6.0 g of 5F-E1 (20 parts by weight on the basis of 100 parts by weight of a fluorine-containing resin), 12.7 g of Takenate D-140N (NCO/OH=1) and 80 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the tests were carried out according to Examples 1 and 19. The results are shown in Table 14.

EXAMPLE 100

To 100 g of the GK-500-based white paint prepared in the same manner as in Example 99 were added 6.0 g of 5F-E2 (20 parts by weight on the basis of 100 parts by weight of a fluorine-containing resin), 12.7 g of Takenate D-140N (NCO/OH=1) and 80.0 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the same tests as in Example 99 were carried out. The results are shown in Table 14.

EXAMPLES 101 TO 108

A coated plate was obtained in the same manner as in Example 100 except that the mixing components and amounts, etc. shown in Table 13 were employed. The same tests as in Example 99 were conducted. The results are shown in Table 14.

TABLE 13

| | Resin | | | | Additive | | | |
|---|---|---|---|---|---|---|---|---|
| | Kind | OH Value (mgKOH/g) | Acid value (mgKOH/g) | Fluorine content (%, based on resin) | Kind | Adding amount (part by weight) | Kind of curing agent | Curing conditions |
| Ex. 99 | GK-500 | 60 | 0 | 35 | 5F-E1 | 20 | 140N | Room temperature, 1W |
| Ex. 100 | " | " | " | " | " | 10 | 140N | Room temperature, 1W |
| Ex. 101 | " | " | " | " | 5F-E2 | 20 | 140N | Room temperature, 1W |
| Ex. 102 | " | " | " | " | " | 10 | 140N | Room temperature, 1W |
| Ex. 103 | " | " | " | " | " | 5 | 140N | Room temperature, 1W |
| Ex. 104 | " | " | " | " | " | 1 | 140N | Room temperature, 1W |
| Ex. 105 | " | " | " | " | 5F-F1 | 20 | 140N | Room temperature, 1W |
| Ex. 106 | " | " | " | " | " | 10 | 140N | Room temperature, 1W |
| Ex. 107 | " | " | " | " | " | 5 | 140N | Room temperature, 1W |
| Ex. 108 | " | " | " | " | " | 1 | 140N | Room temperature, 1W |

TABLE 14

| | Curability | Gloss | Pencil hardness | Flexibility (mm) | Impact resistance (cm) | Stain-proofing property (−ΔL*) |
|---|---|---|---|---|---|---|
| Ex. 99 | A | 82 | 2H | 2 | 100 | A |
| Ex. 100 | A | 80 | 2H | 2 | 100 | A |
| Ex. 101 | A | 81 | 2H | 2 | 100 | A |
| Ex. 102 | A | 81 | 2H | 2 | 100 | A |
| Ex. 103 | A | 79 | 2H | 2 | 100 | A |
| Ex. 104 | A | 79 | 2H | 2 | 100 | B |
| Ex. 105 | A | 80 | 2H | 2 | 100 | A |
| Ex. 106 | A | 81 | 2H | 2 | 100 | A |
| Ex. 107 | A | 78 | 2H | 2 | 100 | A |
| Ex. 108 | A | 79 | 2H | 2 | 100 | A |

| | Stain removable property (−ΔL*) | Intercoat adhesion of repair coatings | Pot life | Compatibility (with naked eyes) | Accelerated weather resistance (Gloss retention ratio %) |
|---|---|---|---|---|---|
| Ex. 99 | A | 100/100 | B | B | 90 |
| Ex. 100 | A | 100/100 | B | B | 89 |
| Ex. 101 | A | 100/100 | B | B | 92 |
| Ex. 102 | A | 100/100 | B | A | 87 |
| Ex. 103 | A | 100/100 | B | A | 92 |
| Ex. 104 | A | 100/100 | B | A | 94 |
| Ex. 105 | A | 100/100 | B | B | 90 |
| Ex. 106 | A | 100/100 | B | B | 91 |
| Ex. 107 | A | 100/100 | B | A | 90 |
| Ex. 108 | A | 100/100 | B | A | 94 |

EXAMPLES 109 TO 112

A coated plate was obtained in the same manner as in Example 1 except that the mixing components and amounts, etc. shown in Table 15 were employed. The same tests as in Example 1 were conducted. The results are shown in Table 16.

TABLE 15

| | Resin | | | Additive | | | |
|---|---|---|---|---|---|---|---|
| | Kind | OH Value (mgKOH/g) | Acid value (mgKOH/g) | Fluorine content (%, based on resin) | Kind | Adding amount (part by weight) | Kind of curing agent | Curing conditions |
| Ex. 109 | GK-500 | 60 | 0 | 35 | Me51 | 40 | 140N | 170° C., 20 minutes |
| Ex. 110 | " | " | " | " | " | 60 | 140N | 170° C., 20 minutes |
| Ex. 111 | " | " | " | " | " | 40 | 140N | 170° C., 20 minutes |
| Ex. 112 | " | " | " | " | " | 60 | 140N | 170° C., 20 minutes |

TABLE 16

| | Curability | Gloss | Pencil hardness | Flexibility (mm) | Impact resistance (cm) |
|---|---|---|---|---|---|
| Ex. 109 | A | 80 | 2H | 2 | 100 |
| Ex. 110 | A | 81 | 2H | 2 | 100 |
| Ex. 111 | A | 83 | 2H | 2 | 100 |
| Ex. 112 | A | 82 | 2H | 2 | 100 |

| | Stain-proofing property (−ΔL*) | Stain removable property (−ΔL*) | Pot life | Compatibility (with naked eyes) | Accelerated weather resistance (Gloss retention ratio %) |
|---|---|---|---|---|---|
| Ex. 109 | E | A | B | B | 91 |
| Ex. 110 | D | A | B | B | 93 |
| Ex. 111 | C | A | B | B | 89 |
| Ex. 112 | C | A | B | B | 92 |

EXAMPLE 113

To 208 g of a vinyl acetate solution (solid content: 60% by weight, hereinafter referred to as "GK-HS") of copolymer (number average molecular weight: 3,000, weight average molecular weight: 8,000, hydroxyl value: 93, acid value: 4.6) comprising 46% by mole of tetrafluoroethylene, 12% by mole of vinyl pivalate, 8% by mole of vinyl benzoate, 20% by mole of hydroxybutyl vinyl ether, 1% by mole of crotonic acid and 13% by mole of vinyl versatate, were added 250 g of CR-95 (titanium oxide available from Ishihara Sangyo Kabushiki Kaisha), 100 g of butyl acetate and 800 g of glass beads, followed by stirring to disperse at 1,500 rpm for one hour with a portable grind mill (three blade type). The glass beads were removed by filtration to give 451.2 g of a dispersion. To the obtained dispersion were added 236.1 g of GK-HS and 121.3 g of butyl acetate, followed by mixing sufficiently to give a GK-HS-based white paint (pigment/resin weight ratio=0.833). To 100 g of the white paint was added 3.0 g of 5F-46 prepared in the same manner as in Preparation Example 3 (10 parts by weight on the basis of 100 parts of a fluorine-containing resin), 19.7 g of Takenate D-140N (NCO/OH=1) and 20 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the same tests as in Example 19 were carried out. The results are shown in Table 17.

EXAMPLE 114

To 100 g of a butyl acetate solution (solid content: 60%) of a fluoroolefin copolymer having a number average molecular weight Mn of 8,000, a weight average molecular weight of 23,000 and an acid value of 63 (mg/KOH) and comprising 47% by mole of tetrafluoroethylene, 12% by mole of vinyl versatate (VeoVa-9), 20% by mole of pivalic acid, 6% by mole of vinyl benzoate and 15% by mole of 3-(2-allyloxyethoxycarbonyl)propionic acid, were added 16.3 g of Denacol EX-301 (triglycidyltris(2-hydroxyethyl) isocyanurate available from Nagase Kasei Kogyo Kabushiki Kaisha), 0.3 g of tetrabutylammonium bromide, 1.5 g of Tinuvin-900 (benzotriazole type ultraviolet ray absorber available from Ciba Geigy Co., Ltd.), 0.5 g of Sanol LS-765 (HALS available from Sankyo Kabushiki Kaisha) and 6.0 g of 5F-46 synthesized in the same manner as in Preparation Example 3 (10 parts by weight on the basis of 100 parts by weight of the fluorine-containing resin). The mixture was then mixed sufficiently and thereto was added xylene to dilute the mixture to a viscosity suitable for coating. The obtained paint was spray-coated on a plate coated with a fluorine-containing resin and produced in the same manner as in Comparative Example 6, and then the coated plate was subjected to baking at 140° C. for 30 minutes to give a total coating thickness of 70 μm. Then the same tests as in Example 19 were carried out. The results are shown in Table 17.

EXAMPLE 115

To 10 g of a white paint (pigment/resin=0.833, solid content: 55%, xylene solution) of acrylic polyol (number average molecular weight: 8,000, weight average molecular weight: 21,500) comprising 30% by mole of methyl methacrylate, 30% by mole of isobutyl methacrylate, 26% by mole of n-butyl methacrylate, 1% by mole of methacrylic acid and 13% by mole of hydroxyethyl methacrylate, was admixed sufficiently 90 g of GK-500-based white paint synthesized in the same manner as in Example 1. Thereto were added 3.0 g of 5F-46 synthesized in the same manner as in Preparation Example 3 (10 parts by weight on the basis of 100 parts by weight of the resin), 12.7 g of Takenate D-140N (NCO/OH=1) and 60 g of butyl acetate, followed by mixing sufficiently. The obtained paint composition was spray-coated on a dull-finished steel plate (0.5 mm thick), dried and cured at room temperature for one week to give a coating thickness of about 40 μm. Then the same tests as in Example 19 were carried out. The results are shown in Table 17.

EXAMPLE 116

To 100 g of a white paint (pigment/resin=0.833, solid content: 55%, butyl acetate solution) of a blended resin (weight ratio: 70/30) of a vinylidene fluoride copolymer (number average molecular weight: 28,000, weight average molecular weight: 70,000) comprising 74% by mole of vinylidene fluoride, 14.5% by mole of tetrafluoroethylene and 11.5% by mole of chlorotrifluoroethylene and polymethyl methacrylate (number average molecular weight: 7,500, weight average molecular weight: 19,000), were added 3.0 g of 5F-46 synthesized in the same manner as in Preparation Example 3 (10 parts by weight on the basis of 100 parts by weight of the resin) and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 17.

EXAMPLE 117

To 100 g of a white paint (pigment/resin=0.833, solid content: 55%, butyl acetate solution) of a blended resin (weight ratio: 30–70) of a vinylidene fluoride copolymer (number average molecular weight: 28,000, weight average molecular weight: 70,000) comprising 74% by mole of vinylidene fluoride, 14.5% by mole of tetrafluoroethylene and 11.5% by mole of chlorotrifluoroethylene and acrylic polyol (number average molecular weight: 7,000, weight average molecular weight: 18,000) comprising 50% by mole of methyl methacrylate, 10% by mole of isobutyl methacrylate, 29% by mole of t-butyl methacrylate, 1% by mole of methacrylic acid and 10% by mole of hydroxyethyl methacrylate, were added 3.0 g of 5F-46 synthesized in the same manner as in Preparation Example 3 (10 parts by weight on the basis of 100 parts by weight of the resin), 3.1 g of Coronate HX and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 17.

EXAMPLE 118

To 100 g of the GK-500-based white paint prepared in the same manner as in Example 1 were added 3.0 g of 5F-46 synthesized in the same manner as in Preparation Example 3 (10 parts by weight on the basis of 100 parts by weight of the resin), 19.0 g of Duranate E408-80T (elastic curing agent available from Asahi Kasei Kogyo Kabushiki Kaisha) (NCO/OH=1) and 60 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the same tests as in Example 19 were carried out. The results are shown in Table 17.

EXAMPLE 119

To 100 g of the GK-500-based white paint prepared in the same manner as in Example 1 were added 3.0 g of 5F-46 synthesized in the same manner as in Preparation Example 3 (10 parts by weight on the basis of 100 parts by weight of a resin), 3.3 g of 3-trimethoxysilylpropylisocyanate, 6.4 g of Takenate D-140N, 3.0 g of Methyl Silicate 51 and 60 g of butyl acetate, followed by mixing sufficiently. The obtained paint composition was applied to a dull-finished steel plate (0.5 mm thick) by spray coating, dried and cured at room temperature for one week to give a coated plate having a coating thickness of about 40 μm. Then the same tests as in Example 19 were carried out. The results are shown in Table 17.

A coated plate subjected to testing of intercoat adhesion of a repair coating in the same manner as in Example 19 was allowed to stand in a controlled temperature and humidity room at a temperature of 50° C. and a relative humidity of 98% for 24 hours. Afterwards, a Cross Cut Test was conducted, and the intercoat adhesion was 100/100. On the contrary, the intercoat adhesion was 50/100 in Example 19, and there was found lowering of the intercoat adhesion.

EXAMPLE 120

To 100 g of a white paint (pigment/resin=0.833, solid content: 55%, butyl acetate solution) of a fluorine-containing silicone copolymer (number average molecular weight: 8,000, weight average molecular weight: 21,000) comprising 46% by mole of tetrafluoroethylene, 14% by mole of vinyl versatate (VeOVa-9), 22% by mole of vinyl pivalate, 8% by mole of vinyl benzoate and 10% by mole of vinyltrimethoxysilane, were added 3.0 g of 5F-46 synthesized in the same manner as in Preparation Example 3 (10 parts by weight on the basis of 100 parts by weight of the resin), 1% of 1% solution of dibutyltindilaurate in butyl acetate and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 17.

EXAMPLE 121

A two-liter four-necked glass flask was charged with 400 g of xylene, followed by replacing with nitrogen gas and heating to 110° C. Thereto was added dropwise a mixture comprising 100 g of γ-methacryloxypropyltrimethoxysilane, 300 g of methyl methacrylate, 490 g of n-butyl methacrylate, 100 g of n-butyl acrylate, 10 g of acrylamide, 180 g of xylene and 10 g of 2,2'-azobisisobutyronitrile over five hours through a dropping funnel with stirring. Then after the dropwise addition, 5 g of 2,2'-azobisisobutyronitrile and 80 g of toluene were added dropwise over one hour, followed by refluxing at 110° C. for two hours. Thereto was added xylene to give an acrylic silicon resin solution having a solid content of 50%. A number average molecular weight of the resin was 13,500 and a weight average molecular weight was 33,000. A white paint (pigment/resin=0.833, solid content: 55%, butyl acetate solution) was prepared in the same manner as in Example 61. To 100 g of the white paint were added 1.5 g of 5F-46 synthesized in the same manner as in Preparation Example 3 (5 parts by weight on the basis of 100 parts by weight of the resin), 0.16 g of a previously prepared mixture of 2-ethylhexanoic acid and dodecylamine (weight ratio: 1/1), 0.4 g of a reaction product of an epoxy resin (Epikote 828 (bisphenol A resin available from Yuka Shell Epoxy Kabushiki Kaisha)) and γ-aminopropyltrimethoxysilane (weight ratio: 1/1) and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 17.

EXAMPLE 122

Tests were carried out in the same manner as in Example 121 except that 0.2 g of aluminium tris(acetylacetonate) was used instead of a previously prepared mixture of 2-ethylhexanoic acid and dodecylamine (weight ratio: 1/1). The results are shown in Table 17.

EXAMPLE 123

A white paint (pigment/resin=0.833, solid content: 55%, butyl acetate solution) of an acrylic silicon resin (number average molecular weight: 3,500, weight average molecular weight: 9,100) comprising 100 parts of γ-methacryloxypropyltrimethoxysilane, 300 parts of methyl methacrylate, 90 parts of n-butyl methacrylate, 500 parts of n-butyl acrylate and 10 parts of acrylamide, was prepared. To 100 g of the white paint were added 1.5 g of 5F-46 synthesized in the same manner as in Preparation Example 3 (5 parts by weight on the basis of 100 parts by weight of the resin), 3.0 g of Methyl Silicate 51, 0.16 g of a previously prepared mixture of 2-ethylhexanoic acid and dodecylamine (weight ratio: 1/1), 0.4 g of a reaction product of an epoxy resin (Epikote 828 (bisphenol A resin available from Yuka Shell Epoxy Kabushiki Kaisha)) and γ-aminopropyltrimethoxysilane (weight ratio: 1/1), 20 g of butyl acetate and 1 g of ethanol, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 17.

EXAMPLE 124

To an inorganic material prepared by mixing 25 g of DC-3037 (organopolysiloxane containing methyl and phenyl and being available from Toray Dow Corning Silicone Kabushiki Kaisha), 15 g of SR2404 (organopolysiloxane containing methyl and being available from Toray Dow Corning Silicone Kabushiki Kaisha), 40 g of methyltrimethoxysilane, 10 g of dimethyldimethoxysilane and 5 g of titanium tetra-n-butoxide were added 19 g of 5F-46 synthesized in the same manner as in Preparation Example 3 (20 parts by weight on the basis of 100 parts by weight of the inorganic material), 2.5 g of aluminium tris(acetylacetonate), 2.0 g of ethyl acetoacetate and 0.5 g of ethanol, followed by mixing sufficiently. The obtained paint composition was spray-coated on a dull-finished steel plate (0.5 mm thick, previously coated with GK-500-based white/Takenate D-140N), dried and cured at room temperature for one week to give a coated plate having a coating thickness of about 40 μm. Then the same tests as in Example 66 were carried out. The results are shown in Table 17.

EXAMPLE 125

To a mixture of 10 g of GK-510-based blue paint (pigment: 5370 (phthalocyanine type organic pigment available from Dainichi Seika Kabushiki Kaisha), pigment/resin=0.1, butyl acetate solution having a solid content of 33%) and 90 g of a GK-500-based white paint prepared in the same manner as in Example 1, were added 3.0 g of 5F-46 synthesized in the same manner as in Preparation Example 3 (10 parts by weight on the basis of 100 parts by weight of the resin), 0.5 g of Disperbyk-110 (wet type dispersing agent available from BYK Chemie Japan Ltd.), 0.1 g of Paintad Q (Silicone type surface modifying agent available from Dow Corning Asia Ltd.), 0.1 g of BYK-052, 2.0 g of Tinuvin 123 (HALS available from Ciba Geigy Co., Ltd.), 0.25 g of Bentone 27 (added being dispersed previously with toluene, Rheology control agent available from NL Chemicals Kabushiki Kaisha), 40 g of butyl acetate, 20 g of 3-methoxypropyl acetate and 12.7 g of Takenate D-140N (NCO/OH=1), followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 17.

EXAMPLE 126

To 100 g of a white paint (pigment/resin=0.833, solid content: 55%, butyl acetate solution) of an acrylic polyol (number average molecular weight: 7,000, weight average molecular weight: 19,000) comprising 10% by mole of methyl methacrylate, 15% by mole of isobutyl methacrylate, 44% by mole of n-butyl acrylate, 1% by mole of methacrylic acid, 15% by mole of hydroxyethyl methacrylate and 15% by mole of styrene, were added 1.5 g of 5F-46 synthesized in the same manner as in Preparation Example 3 (5 parts by weight on the basis of 100 parts by weight of the resin), 7.5 g of Cymel 303 (complete alkyl type methylated melamine available from Mitsui Cyanamid Kabushiki Kaisha), 0.3 g of Catalyst 4040 (aromatic sulfonic acid type curing catalyst available from Mitsui Cyanamid Kabushiki Kaisha) and 60 g of butyl acetate, followed by mixing sufficiently. The obtained paint composition was spray-coated on a dull-finished steel plate (0.5 mm thick), dried and cured at 130° C. for 20 minutes to give a coated plate having a coating thickness of about 40 μm. Then the same tests as in Example 19 were carried out. The results are shown in Table 17.

EXAMPLE 127

Tests were carried out in the same manner as in Example 126 except that 13.2 g of Desmodur BL-3175 (blocked HDI isocyanate available from Sumitomo Bayer Urethane Kabushiki Kaisha) was used instead of Cymel 303 and Catalyst 4040 and that the curing was conducted at 170° C. for 20 minutes. The results are shown in Table 17.

TABLE 17

|  | Curability | Gloss | Pencil hardness | Flexibility (mm) | Impact resistance (cm) |
|---|---|---|---|---|---|
| Ex. 113 | A | 83 | 2H | 6 | 50 |
| Ex. 114 | A | 85 | 2H | 6 | 60 |
| Ex. 115 | A | 86 | 2H | 2 | 100 |
| Ex. 116 | A | 78 | H | 2 | 100 |
| Ex. 117 | A | 85 | 2H | 6 | 50 |
| Ex. 118 | A | 83 | B | 2 | 100 |
| Ex. 119 | A | 86 | 3H | 6 | 40 |
| Ex. 120 | A | 83 | 2H | 2 | 100 |
| Ex. 121 | A | 91 | 2H | 6 | 55 |
| Ex. 122 | A | 90 | 2H | 6 | 50 |
| Ex. 123 | A | 93 | H | 6 | 40 |
| Ex. 124 | A | 92 | 2H | 2 | 100 |
| Ex. 125 | A | 83 | 2H | 2 | 100 |
| Ex. 126 | A | 92 | 2H | 8 | 45 |
| Ex. 127 | A | 93 | 2H | 2 | 100 |

|  | Stain-proofing property (−ΔL*) | Stain removable property (−ΔL*) | Pot life | Compatibility (with naked eyes) | Accelerated weather resistance (Gloss retention ratio %) |
|---|---|---|---|---|---|
| Ex. 113 | A | A | B | B | 90 |
| Ex. 114 | A | A | A | B | 91 |
| Ex. 115 | A | A | B | B | 90 |
| Ex. 116 | A | A | A | B | 94 |
| Ex. 117 | A | A | B | B | 85 |
| Ex. 118 | B | B | B | B | 93 |
| Ex. 119 | A | A | B | B | 92 |
| Ex. 120 | A | A | B | B | 95 |
| Ex. 121 | A | A | B | B | 80 |
| Ex. 122 | A | A | B | B | 83 |
| Ex. 123 | A | A | B | B | 78 |
| Ex. 124 | A | A | B | B | 96 |
| Ex. 125 | A | A | B | B | 93 |
| Ex. 126 | A | A | A | B | 30 |
| Ex. 127 | A | A | A | B | 25 |

EXAMPLE 128

To 100 g of a white paint (pigment/resin=0.833, solid content: 55%, butyl acetate solution) of a copolymer (number average molecular weight: 12,000, weight average molecular weight: 34,000) comprising 46% by mole of tetrafluoroethylene, 15% by mole of ethylene, 22% by mole of vinyl pivalate, 6% by mole of vinyl benzoate and 11% by mole of 4-hydroxybutyl vinyl ether, were added 3.0 g of 4F-35 synthesized in Preparation Example 13 (10 parts by weight on the basis of 100 parts by weight of the resin), 0.5 g of dimethylsilicone type coupling agent, 11.7 g of Takenate D-140N and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 129

To 90 g of a white paint (pigment/resin=0.833, solid content: 55%, butyl acetate solution) of a copolymer (number average molecular weight: 12,000, weight average molecular weight: 34,000) comprising 46% by mole of tetrafluoroethylene, 14.5% by mole of isobutylene, 22% by mole of vinyl pivalate, 6% by mole of vinyl benzoate, 0.5% by mole of 2,2,3,3-tetrafluoropropyl vinyl ether and 11% by mole of 4-hydroxybutyl vinyl ether, were added 10 g of a white paint (pigment/resin=0.833, solid content: 55%, xylene solution) of an acrylic polyol (number average molecular weight: 8,000, weight average molecular weight: 21,500) comprising 30% by mole of methyl methacrylate, 30% by mole of isobutyl methacrylate, 26% by mole of n-butyl methacrylate, 1% by mole of methacrylic acid and 13% by mole of hydroxyethyl methacrylate, 3.0 g of 4F-35 synthesized in Preparation Example 13 (10 parts by weight on the basis of 100 parts by weight of the resin), and then 12.0 g of Takenate D-140N and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 130

An amount of 10 g of a white paint (pigment/resin=0.833, solid content: 55%, xylene solution) of an acrylic polyol (number average molecular weight: 9,000, weight average molecular weight: 23,500) comprising 10% by mole of methyl methacrylate, 60% by mole of isobutyl methacrylate, 26% by mole of n-butyl methacrylate, 1% by mole of methacrylic acid and 13% by mole of hydroxyethyl methacrylate and 90 g of GK-500-based white paint synthesized in the same manner as in Example 1 were mixed sufficiently. To the obtained mixture were added 3.0 g of 4F-35 synthesized in the same manner as in Preparation Example 13 (10 parts by weight on the basis of 100 parts by weight of the resin), 1.5 g of DC-3037 (organopolysiloxane containing methyl and phenyl and being available from Toray Dow Corning Silicone Kabushiki Kaisha), 1.0 g of methyltrimethoxysilane, 0.02 g of aluminium tris (acetylacetonate), 11.4 g of Takenate D-140N and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 131

To 100 g of a white paint (pigment/resin=0.833, solid content: 55%, butyl acetate solution) of a blended resin (weight ratio: 30/70) of a vinylidene fluoride copolymer (number average molecular weight: 28,000, weight average molecular weight: 70,000) comprising 74% by mole of vinylidene fluoride, 14.5% by mole of tetrafluoroethylene and 11.5% by mole of chlorotrifluoroethylene and an acrylic polyol (number average molecular weight: 7,000, weight average molecular weight: 18,000) comprising 10% by mole of methyl methacrylate, 50% by mole of isobutyl methacrylate, 29% by mole of t-butyl methacrylate, 1% by mole of methacrylic acid and 10% by mole of hydroxyethyl methacrylate, were added 3.0 g of 4F-35 synthesized in the same manner as in Preparation Example 13 (10 parts by weight on the basis of 100 parts by weight of the resin), 1.5 g of SR2404 (methyl group-containing organopolysiloxane available from Toray Dow Corning Silicone Kabushiki Kaisha), 1.5 g of methyltrimethoxysilane, 0.02 g of aluminium tris(acetylacetonate), 2.8 g of Coronate HX, 60 g of butyl acetate and 5.0 g of N,N-dimethylacetamide, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 132

A white paint (pigment/resin=0.833, solid content: 55%, butyl acetate solution) of an acrylic silicon resin (number average molecular weight: 3,500, weight average molecular weight: 9,100) comprising 100 parts of γ-methacryloxypropyltrimethoxysilane, 300 parts of methyl methacrylate, 90 parts of n-butyl methacrylate, 500 parts of n-butyl acrylate and 10 parts of acrylamide was prepared. To 100 g of the white paint were added 1.5 g of 4F-35 synthesized in the same manner as in Preparation Example 13 (5 parts by weight on the basis of 100 parts by weight of the resin), 5.0 g of SR2404 (methyl group-containing organopolysiloxane available from Toray Dow Corning Silicone Kabushiki Kaisha), 0.5 g of methyltrimethoxysilane, 0.1 g of aluminium tris(acetylacetonate), 0.05 g of tetrabutoxy titanium, 0.4 g of a reaction product of an epoxy resin (Epikote 828 (bisphenol A type resin available from Yuka Shell Epoxy Kabushiki Kaisha)) and γ-aminopropyltrimethoxysilane (weight ratio: 1/1), 20 g of butyl acetate and 1 g of ethanol, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 133

To 100 g of a GK-500-based white paint prepared in the same manner as in Example 1 were added 3.0 g of 4F-35 synthesized in the same manner as in Preparation Example 13 (10 parts by weight on the basis of 100 parts by weight of a resin), 5.0 g of SR2404 (methyl group-containing organopolysiloxane available from Toray Dow Corning Silicone Kabushiki Kaisha), 0.5 g of FZ-3739 (dimethyl silicone which is block-modified with polyether at both ends thereof), 0.5 g of 3-trimethoxysilylpropylisocyanate, 0.5 g of methyltrimethoxysilane, 0.1 g of aluminium tris (acetylacetonate), 10.2 g of Takenate D-140N and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 134

To 100 g of a GK-500-based white paint prepared in the same manner as in Example 1 were added 3.0 g of 4F-35 synthesized in the same manner as in Preparation Example 13 (10 parts by weight on the basis of 100 parts by weight of a resin), 3.0 g of SR2404 (methyl group-containing organopolysiloxane available from Toray Dow Corning Silicone Kabushiki Kaisha), 0.5 g of 3-triethoxysilylpropylisocyanate, 1.0 g of methyltris (ethylmethylketoxime)silane, 10.2 g of Takenate D-140N and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 135

To 100 g of a GK-500-based white paint prepared in the same manner as in Example 1 were added 3.0 g of 4F-H synthesized in the same manner as in Preparation Example 14 (10 parts by weight on the basis of 100 parts by weight of a resin), 3.0 g of SR2404 (methyl group-containing organopolysiloxane available from Toray Dow Corning Silicone Kabushiki Kaisha), 0.5 g of 3-triethoxysilylpropylisocyanate, 0.5 g of dimethyldimethoxysilane, 0.1 g of aluminium tris (ethylacetoacetate), 10.2 g of Takenate D-140N and 60 g of butyl acetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

EXAMPLE 136

To 100 g of a GK-500-based white paint prepared in the same manner as in Example 1 were added 3.0 g of 4F-PE prepared in Preparation Example 15 (10 parts by weight on the basis of 100 parts by weight of a resin), 3.0 g of SR2404 (methyl group-containing organopolysiloxane available from Toray Dow Corning Silicone Kabushiki Kaisha), 0.5 g of 3-triethoxysilylpropylisocyanate, 0.5 g of dimethyldimethoxysilane, 0.1 g of aluminium tris (ethylacetoacetate), 10.2 g of Takenate D-140N, 60 g of butyl acetate, 5.0 g of N-methylacetamide and 10.0 g of 2-methoxyethylacetate, followed by mixing sufficiently. The obtained paint composition was spray-coated on a dull-finished steel plate (0.5 mm thick), dried and cured at room temperature for one week to give a coated plate having a coating thickness of about 40 μm. Then the same tests as in Example 19 were carried out. The results are shown in Table 18.

TABLE 18

|  | Curability | Gloss | Pencil hardness | Flexibility (mm) | Impact resistance (cm) |
|---|---|---|---|---|---|
| Ex. 128 | A | 82 | 2H | 2 | 100 |
| Ex. 129 | A | 84 | 2H | 2 | 100 |
| Ex. 130 | A | 81 | 2H | 2 | 100 |
| Ex. 131 | A | 80 | 2H | 2 | 100 |
| Ex. 132 | A | 82 | 3H | 10 | 50 |

TABLE 18-continued

| | | | | | |
|---|---|---|---|---|---|
| Ex. 133 | A | 82 | 3H | 6 | 60 |
| Ex. 134 | A | 81 | 3H | 2 | 60 |
| Ex. 135 | A | 82 | 3H | 2 | 60 |
| Ex. 136 | A | 80 | 3H | 2 | 80 |

| | Stain-proofing property (−ΔL*) | Stain removable property (−ΔL*) | Pot life | Compatibility (with naked eyes) | Accelerated weather resistance (Gloss retention ratio %) |
|---|---|---|---|---|---|
| Ex. 128 | A | A | B | A | 90 |
| Ex. 129 | A | A | B | A | 92 |
| Ex. 130 | A | A | B | A | 94 |
| Ex. 131 | A | A | B | A | 91 |
| Ex. 132 | A | A | B | A | 85 |
| Ex. 133 | A | A | B | A | 92 |
| Ex. 134 | A | A | B | A | 90 |
| Ex. 135 | A | A | B | A | 92 |
| Ex. 136 | A | A | B | A | 92 |

EXAMPLES 137

Evaluation of Repeatability

The same stain-proofing property test as in Example 32 was repeated ten times, and the differences in lightness before and after each test were averaged to evaluate repeatability of the stain-proofing property. The average stain-proofing property was evaluated as "A".

Further the same stain-proofing property test as in Example 3 was repeated ten times and the differences in lightness before and after each test were averaged to evaluate repeatability of the stain-proofing property. The average stain-proofing property was evaluated as "C".

The abbreviations used in Tables 1 to 17 represent the followings.
Resin;
  GK-500: Zeffle GK-500, fluorine-containing resin polyol available from Daikin Industries, Ltd.
  GK-510: Zeffle GK-510, fluorine-containing resin polyol available from Daikin Industries, Ltd. (OH value: 60 (mgKOH/g), acid value: 9 (mgKOH/g))
  LF-200: Lumiflon LF-200, fluorine-containing resin polyol available from Asahi Glass Kabushiki Kaisha
  A-801: Acrydic A-801, acrylic polyol available from Dai Nippon Ink Kagaku Kogyo Kabushiki Kaisha
  YC3623: Gemlac YC3623, acrylic silicon resin available from Kaneka Corporation
  A-3: Ecolton A-3, siloxane type inorganic material available from Gunze Sangyo Kabushiki Kaisha
Silicate;
  Me39: Methyl Silicate 39, methyl silicate monomer available from Colcoat Kabushiki Kaisha
  Me51: Methyl Silicate 51, methyl silicate tetramer available from Colcoat Kabushiki Kaisha (average)
  Et28: Ethyl Silicate 28, ethyl silicate monomer available from Colcoat Kabushiki Kaisha
  Et40: Ethyl Silicate 40, ethyl silicate pentamer available from Colcoat Kabushiki Kaisha
  HAS-1: Partly dehydrated tetraethoxysilane (30% isopropanol solution, $SiO_2$ content: 20%) available from Colcoat Kabushiki Kaisha Curing agent;
  140N: Takenate D-140N, isophoronediisocyanate type isocyanate available from Takeda Yakuhin Kogyo Kabushiki Kaisha, NCO/OH=1.0
  Sn: Dibutyltindilaurate (curing catalyst), 1% of 1% solution is added on the basis of a resin
  Specific curing agent: Curing agent for Ecolton A-3
  HX: Coronate HX, hexamethylenediisocyanate type isocyanate available from Nippon Polyurethane Kogyo Kabushiki Kaisha, NCO/OH=1.0
  4165: BL-4165, isophoronediisocyanate type blocked isocyanate available from Sumitomo Bayer Urethane Kabushiki Kaisha, NCO/OH=1.0, A 1% solution of dibutyltindilaurate is added as a curing catalyst in an amount of 0.5% on the basis of a resin.
  303: Cymel 303, melamine resin available from Mitsui Cyanamid Kabushiki Kaisha, fluorine-containing resin/melamine=8.5/1.5 (weight ratio)
  0.3: Takenate D-140N to be used at NCO/OH=0.3
  Isopropanol: Indicating its amount as part by weight added on the basis of 100 parts by weight of a fluorine-containing resin Then examples of application of the non-aqueous composition for paints of the present invention are raised below.

APPLICATION EXAMPLE 1

An ethylene-vinyl acetate copolymer paint was applied on a slate (6 mm thick), and dried at 20° C. for 180 minutes. Thereon was further applied an epoxy resin emulsion paint mixed with 60% by weight of cement, followed by drying at 20° C. for 1,440 minutes. The same fluorine-containing resin paint as in Example 33 was applied as a top coating so that a coating thickness after drying at 20° C. for one week would be 30 μm.

APPLICATION EXAMPLE 2

Application procedures were repeated in the same manner as in Application Example 1 except that the paint for top coating was changed to the same acrylic silicon resin paint as in Example 121.

APPLICATION EXAMPLE 3

A permeable sealer (epoxypolyamide curable sealer) was roller-coated on a surface of concrete for building so that a coating amount would be 0.03 to 0.06 kg/m² (solid content), and dried at 20° C. for 180 minutes. Thereon was further spray-coated an elastic paint of an acrylic rubber so that a coating amount would be 1.3 to 1.5 kg/m², followed by drying at 20° C. for 1,440 minutes. The same fluorine-containing resin paint as in Example 118 was then applied as a top coating so that a coating thickness after drying at 20° C. for one week would be 30 μm.

APPLICATION EXAMPLE 4

Application procedures were repeated in the same manner as in Application Example 3 except that the paint for top coating was changed to the same acrylic silicon resin paint as in Example 121.

APPLICATION EXAMPLE 5

An acrylic emulsion sealer was roller-coated on a surface of a ALC plate so that a coating amount would be 0.03 to 0.06 kg/m² (solid content), and dried at 2° C. for 180 minutes. Thereon was further coated a cement type surface preparation paint with a lithin gun (3 mm) so that a coating amount would be 1.0 to 2.0 kg/m², followed by drying at 20° C. for 1,440 minutes. Then an acrylic emulsion paint was coated thereon with a tile gun (4 to 5 mm) so that a coating amount would be 1.0 to 2.0 kg/m², followed by drying at 20° C. for 1,440 minutes. Further an acrylic urethane type paint was applied to give a coating thickness of 20 μm Then the same fluorine-containing resin paint as in Example 33 was applied as a paint for top coating so that a coating thickness after drying at 20° C. for one week would be 30 μm.

APPLICATION EXAMPLE 6

Application procedures were repeated in the same manner as in Application Example 5 except that t he paint for top coating was changed to the same acrylic silicon resin paint as in Example 122.

APPLICATION EXAMPLE 7

A mixture prepared by dissolving 50.0 parts of methyltrimethoxysilane in 30.0 parts of isopropanol was mixed, with stirring, to an aqueous solution containing 1.2 parts of 0.1N hydrochloric acid. The obtained milk-white paint composition for primer coating was spray-coated on a road concrete plate which had previously been cured by drying, and then dried at 20° C. for 180 minutes. A paint for top coating was prepared by adding 6.0 parts of Selidast 3620 (flatting agent available from Hoechst Industries Co., Ltd.) and 5.0 parts of 5F-46 synthesized in the same manner as in Preparation Example 3 (10 parts by weight on the basis of 100 parts by weight of the resin) to 100 parts of a blended resin (weight ratio: 70/30) solution (solid content: 50%, butyl acetate solution) of a vinylidene fluoride copolymer (number average molecular weight: 28,000, weight average molecular weight: 70,000) comprising 74% by mole of vinylidene fluoride, 14.5% by mole of tetrafluoroethylne and 11.5% by mole of chlorotrifluoroethylene and polymethyl methacrylate (number average molecular weight: 7,500, weight average molecular weight: 19,000), and then 100 parts of butyl acetate was admixed sufficiently. The obtained paint for top coating was spray-coated on the primer coating so that a coating thickness after drying at 20° C. for one week would be 30 μm.

APPLICATION EXAMPLE 8

Application procedures were repeated in the same manner as in Application Example 7 except that the paint for primer coating was changed to Aquaseal 200S (water absorption preventing agent of silicone available from Sumitomo Seika Kabushiki Kaisha) and a coating amount thereof was 0.1 liter/m².

APPLICATION EXAMPLE 9

A mixture prepared by dissolving 50.0 parts of methyltrimethoxysilane in 30.0 parts of isopropanol was mixed, with stirring, to an aqueous solution containing 1.2 parts of 0.1N hydrochloric acid. The obtained milk-white paint composition for primer coating was spray-coated on a road concrete plate which had previously been cured by drying, and then dried at 2° C. for 180 minutes. Then a paint for intermediate coating prepared by adding 25.4 parts of Takenate D-140N and 100 parts of butyl acetate to a dispersion obtained by dispersing 100 parts of precipitated barium sulfate in 100 parts of Zeffle GK-500 (solid content: 60%) was spray-coated and dried at 20° C. for 1,440 minutes. Further as a paint for top coating, a sufficiently mixed mixture comprising 100 parts of Zeffle GK-500 (solid content: 60%), 6.6 parts of Selidast 9615A (flatting agent available from Hoechst Industries Co., Ltd.), 6.0 parts of 5F-46 synthesized in the same manner as in Preparation Example 3 (10 parts by weight on the basis of 100 parts by weight of the resin), 25.4 parts of Takenate D-140N and 100 parts of butyl acetate was spray-coated so that a coating thickness after drying at 20° C. for one week would be 30 μm.

APPLICATION EXAMPLE 10

Application procedures were repeated in the same manner as in Application Example 9 except that the paint for primer coating was changed to Aquaseal 200S (water absorption preventing agent of silicone available from Sumitomo Seika Kabushiki Kaisha) and a coating amount thereof was 0.1 liter/m².

APPLICATION EXAMPLE 11

Mill scale of a rolled steel plate was removed with a shot blasting device and then to the plate was immediately applied a long term outdoor exposure type inorganic zinc rich primer. The steel plate was subjected to blast cleaning or power tool cleaning, spray-coated with an inorganic zinc rich paint comprising 25 parts of Ethyl Silicate 40 and 75 parts of zinc powder so that the coating thickness after drying would be 75 μm, and then dried at room temperature for one week.

Subsequently the steel plate was mist-coated with an under coating paint of an epoxy resin. The under coating paint was prepared by adding 20 parts of a curing agent obtained by mixing 60 parts of Tohmide #245 (polyamide resin available from Fuji Kasei Kogyo Kabushiki Kaisha, active hydrogen equivalent: 90) and 40 parts of isobutanol with stirring by means of a dispersing device, into 80 parts of a matrix resin obtained by kneading, with rollers, a composition comprising 25 parts of Epikote 828 (bisphenol epoxy resin available from Shell Kagaku Kabushiki Kaisha, epoxy equivalent: 184 to 194), 20 parts of titanium pigment, 15 parts of talc, 15 parts of precipitated barium sulfate, 2 parts of organic bentonite type antisettling agent, 13 parts of methyl isobutyl ketone and 10 parts of xylene, and then diluting with methyl isobutyl ketone and isobutanol. The steel plate was dried at room temperature for one day.

Further the under coating paint of epoxy resin was applied so that the coating thickness thereof after drying would become 60 μm, and dried at room temperature for one week. Furthermore the same under coating paint of epoxy resin was applied so that the coating thickness thereof after drying would become 60 μm, and dried at room temperature for one week.

Subsequently on the under coating was applied an intermediate coating paint of an epoxy resin so that the coating thickness after drying would become 30 μm. The intermediate coating paint was prepared by adding 20 parts of a curing agent obtained by mixing 60 parts of Tohmide #245 (polyamide resin available from Fuji Kasei Kogyo Kabushiki Kaisha, active hydrogen equivalent: 90) and 40 parts of isobutanol, with stirring, by means of a dispersing device, into 80 parts of a matrix resin prepared by dispersing 20 parts of titanium pigment in a composition comprising 25 parts of Epikote 828 (bisphenol epoxy resin available from Shell Kagaku Kabushiki Kaisha, epoxy equivalent: 184 to 194), 13 parts of methyl isobutyl ketone and 10 parts of xylene. Then the steel plate was dried at room temperature for three days. Lastly the top coating paint of the fluorine-containing resin composition of Example 33 was applied so that the coating thickness after drying would become 30 μm, and dried at room temperature for one week.

APPLICATION EXAMPLE 12

Application procedures were repeated in the same manner as in Application Example 11 except that the paint for top coating was changed to the same fluorine-containing resin composition as in Example 115.

APPLICATION EXAMPLE 13

Application procedures were repeated in the same manner as in Application Example 11 except that the paint for top coating was changed to the same acrylic silicon resin composition as in Example 121.

APPLICATION EXAMPLE 14

After forming a cationic electrodeposition coating film and an intermediate coating film of polyester resin on a mild steel plate, a top coating paint of the same fluorine-containing resin composition as in Example 96 was applied by air spraying so that the coating thickness after drying would become 30 μm. Then the steel plate was dried at 140° C. for 20 minutes.

APPLICATION EXAMPLE 15

A zinc-phosphate-treated aluminium plate was coated with an epoxy wash primer so that the coating thickness thereof would be 15 μm. Then 20.2 parts of BL-3175(HDI type blocked isocyanate available from Sumitomo Bayer Urethane Kabushiki Kaisha) was added to 100 parts of Acrydic A-801-based white paint (titanium oxide, pigment/resin=0.833, solid content: 55%), followed by diluting with xylene up to such a viscosity as making coating procedure possible. The obtained paint was applied on the aluminium plate so as to give a coating thickness of 20 μm after drying, and then cured at 170° C. for 20 minutes.

Subsequently on the coating film was applied a paint so as to give a coating thickness of 25 μm after drying, said paint being prepared by adding 5 parts of Alpaste 1109M (available from Toyo Aluminium Kabushiki Kaisha) and 24.3 parts of BL-3175 to 100 parts of GK-500, followed by diluting with butyl acetate up to such a viscosity as making coating procedure possible. Further on the wet coating film was applied a paint through wet-on-wet method so as to give a coating thickness of 25 μm after drying, said paint being prepared by adding 6.0 g of 5F-46 synthesized in the same manner as in Preparation Example 3 (10 parts by weight on the basis of 100 parts by weight of the resin), 1.5 g of Tinuvin-900 (ultraviolet ray absorber of benzotriazole available from Ciba Geigy Co., Ltd.), 0.5 g of Sanol LS-765 (HALS available from Sankyo Kabushiki Kaisha), 24.3 parts of BL-3175 and 1 part of a 1% butyl acetate solution of dibutyltindilaurate to 100 parts of GK-500, followed by diluting with butyl acetate up to such a viscosity as making coating procedure possible. Then the aluminium plate was cured at 170° C. for 20 minutes.

APPLICATION EXAMPLE 16

To 100 parts of GK-500 were added 6.0 parts of 5F-46 synthesized in the same manner as in Preparation Example 3 (10 parts by weight on the basis of 100 parts by weight of the resin), 1 part of KBM-403 (epoxy group-containing silane coupling agent available from Shin-Etsu Kagaku Kogyo Kabushiki Kaisha), 1.5 parts of Tinuvin-900 (ultraviolet ray absorber of benzotriazole available from Ciba Geigy Co., Ltd.), 0.5 part of Sanol LS-765 (HALS available from Sankyo Kabushiki Kaisha), 24.3 parts of BL-3175 and 1 part of a 1% butyl acetate solution of dibutyltindilaurate, followed by diluting with butyl acetate up to such a viscosity as making coating procedure possible. The obtained paint was applied on SUS 304HL (Hairline-finished and chromate-treated) to give a coating thickness of 30 μm after drying, and then cured at 170° C. for 20 minutes.

APPLICATION EXAMPLE 17

Application procedures were repeated in the same manner as in Application Example 16 except that the paint for top coating was changed to the acrylic silicon resin of Example 122.

APPLICATION EXAMPLE 18

A film of 0.13 mm in thickness was prepared by uniformly mixing 100 parts of SG-1400 (vinyl chloride resin available from Ryonichi Kabushiki Kaisha), 43 parts of dioctyl phthalate, 3 parts of ADK CIZER O-130P (epoxidated soy bean oil available from Adk Argus Kabushiki Kaisha), 5 parts of tricresyl phosphate (available from Daihachi Kagaku Kabushiki Kaisha), 2 parts of Mark AC-153 (barium-zinc stabilizer available from Adk Argus Kabushiki Kaisha), 0.5 part of barium stearate, 1.0 part of zinc stearate, 0.5 part of sorbitan monopalmitate, 1.0 part of sorbitan monostearate and 0.8 part of Tinuvin 327 (ultraviolet ray absorber available from Ciba Geigy Co., Ltd.), followed by calender rolling.

Thereon was applied a paint composition for top coating comprising 10 parts of a solution (solid content: 60%, xylene solution) of acrylic polyol (number average molecular weight: 8,000, weight average molecular weight: 21,500) comprising 30% by mole of methyl methacrylate, 30% by mole of isobutyl methacrylate, 26% by mole of n-butyl methacrylate, 1% by mole of methacrylic acid and 13% by mole of hydroxyethyl methacrylate; 90 parts of GK-500 (solid content: 60%, butyl acetate solution); 6.0 parts of 5F-46 synthesized in the same manner as in Preparation Example 3 (10 parts by weight on the basis of 100 parts by weight of the resin); 12.8 parts of Coronate HX; and 300 parts of butyl acetate, so as to give a coating thickness of 5 μm after drying.

APPLICATION EXAMPLE 19

The same fluorine-containing resin paint as in Example 115 was applied on a surface of a plasticized vinyl chloride resin sheet with a gravure coater so as to give a coating thickness of 15 μm after drying.

APPLICATION EXAMPLE 20

The same acrylic silicon resin paint as in Example 121 was applied on a surface of a plasticized vinyl chloride resin sheet with a gravure coater so as to give a coating thickness of 15 μm after drying.

APPLICATION EXAMPLE 21

By using polyester multifilaments of 750 d/70 f for both warp yarn and weft yarn, a woven fabric of an imitative plain gauge structure having a density of warp of 33 yarns/inch and weft of 33 yarns/inch and being complete with six each of warp and weft yarns was produced. The obtained base fabric was subjected to dip-coating with a composition comprising 100 parts of a vinyl chloride resin compound, 60 parts of di-2-methylhexyl phthalate, 20 parts of calcium carbonate, 3 parts of zinc stearate and 10 parts of a pigment (coating amount: 160 g/m², drying temperature: 100° C.) and then baking at 180° C. to give a mesh sheet coated with the vinyl chloride resin.

Then the mesh sheet was dipped in a solution which was a top coating paint comprising 100 parts of a blended resin (weight ratio: 70/30) solution (solid content: 50%, butyl acetate solution) containing a vinylidene fluoride copolymer (number average molecular weight: 28,000, weight average molecular weight: 70,000) comprising 74% by mole of vinylidene fluoride, 14.5% by mole of tetrafluoroethylene and 11.5% by mole of chlorotrifluoroethylene and a polymethyl methacrylate (number average molecular weight: 7,500, weight average molecular weight: 19,000); 1.0 part of Sumisorb 130 (ultraviolet ray absorber of benzophenone available from Sumitomo Kagaku Kabushiki Kaisha); 0.5 part of Sanol LS-765 (HALS available from Sankyo Kabushiki Kaisha); 5.0 parts of 5F-46 synthesized in the same manner as in Preparation Example 3 (10 parts by weight on the basis of 100 parts by weight of the resin); 300 parts of butyl acetate; and 100 parts of 3-methoxypropyl acetate. The dipped mesh sheet was squeezed with a mangle (amount of the coating on the basis of a solid content: 1 g/m²), dried at 80° C. and then heat-treated at 140° C. for one minute.

APPLICATION EXAMPLE 22

Application procedures were repeated in the same manner as in Application Example 21 except that the top coating paint was changed to a solution comprising 100 parts of Zeffle GK-500, 12.8 g of Coronate HX (HDI type isocyanate available from Nippon Polyurethane Kabushiki Kaisha), 1.5 parts of Sumisorb 130 (ultraviolet ray absorber of benzophenone available from Sumitomo Kagaku Kabushiki Kaisha), 0.5 part of Sanol LS-765 (HALS available from Sankyo Kabushiki Kaisha), 6.0 parts of 5F-46 synthesized in the same manner as in Preparation Example 3 (10 parts by weight on the basis of 100 parts by weight of the resin), 300 parts of butyl acetate and 100 parts of 3-methoxypropyl acetate.

APPLICATION EXAMPLE 23

The paint for top coating of Application Example 22 was applied on a peelable liner with a knife coater and dried at 80° C. for 30 minutes. Then a vinyl organosol comprising 100 parts of a vinyl resin (vinyl chloride type) and 35 parts of a polymer plasticizer was knife-painted on the liner coated with the fluorine-containing resin, followed by drying at 80° C. for one minute and succeedingly fusing at 150° C. for 30 seconds, then at 200° C. for 30 seconds to give a laminated article of vinyl film/fluorine-containing coating/peelable liner. Then on the laminated article was applied a pressure sensitive adhesive and the liner was peeled off to give a marker film for outdoor decoration which is composed of adhesive/vinyl film/fluorine-containing coating. Further the obtained film was adhered to a painted aluminium panel.

APPLICATION EXAMPLE 24

Application procedures were repeated in the same manner as in Application Example 23 except that the same fluorine-containing paint as in Application Example 21 was used.

APPLICATION EXAMPLE 25

A galvanized steel sheet having been subjected to degreasing treatment and phosphating treatment was roll-coated with a vinyl chloride resin adhesive, being conveyed at a speed of 40 m/minute, followed by baking at 230° C. for one minute to form a 3 μm thick adhesive layer. Thereon was roll-coated a plastisol of a poly(vinyl chloride) resin paint comprising 100 parts of Zeon 121 (vinyl chloride resin available from Nippon Zeon Kabushiki Kaisha), 20 parts of a trimellitic acid ester plasticizer (available from Kurogane Kasei Kabushiki Kaisha), 10 parts of Polycizer 202 (polyester plasticizer available from Dai Nippon Ink Kagaku Kogyo Kabushiki Kaisha), 20 parts of dioctyl phthalate, 3 parts of Advastab T-17MJ (heat resistance and weather resistance stabilizer available from Katsuta Kako Kabushiki Kaisha) and 20 parts of Titan R-820 (titanium dioxide available from Ishihara Sangyo Kabushiki Kaisha), followed by baking at 200° C. for 90 seconds to form a 100 μm thick vinyl chloride resin layer.

Thereon was roll-coated a synthetic resin primer comprising 40 parts of Almatex L-1043 (thermoplastic acrylic resin available from Mitsui Toatsu Kabushiki Kaisha), 10 parts of BKS-2750 (epoxy-phenol resin available from Showa Union Gosei Kabushiki Kaisha), 10 parts of VAGH (vinyl acetate-vinyl chloride copolymer resin available from UCC) and 20 parts of Titan R-820 (titanium dioxide available from Ishihara Sangyo Kabushiki Kaisha), followed by baking at 200° C. for one minute to form a 3 μm thick adhesive layer. Then on the obtained layer was roll-coated a paint composition for top coating, followed by baking at 245° C. for 90 seconds to form a 25 μm thick fluorine-containing resin coating film. The paint was prepared by adding 5F-46 synthesized in the same manner as in Preparation Example 3, in an amount of 10 parts by weight on the basis of 100 parts by weight of a resin, to a white paint (organosol solution of isophorone) comprising a mixture resin of (1) VP-850 (vinylidene fluoride polymer available from Daikin Industries, Ltd., melting viscosity: 1.7 to 3.3 g/10 minutes, 280° C., load: 10 kg) and (2) an acrylic silicon resin (number average molecular weight: 18,000, weight average molecular weight: 52,000) comprising 75% by mole of methyl methacrylate, 15% by mole of isobutyl methacrylate and 10% by mole of γ-methacryloxypropyltrimethoxysilane (weight ratio: (1)/(2)=7/3).

The coated articles obtained in Application Examples 1 to 25 were exposed outdoor for six months. After the exposing, there was almost no stain adhesion thereto, and stain-proofing properties thereof were all evaluated as "A" or "B" according to the same evaluation method as in Example 1.

As a reference experiment, there was evaluated a role of the compound represented by the formula (1) as an additive.

In order to evaluate surface conditions of a coated plate having improved stain-proofing property, ESCA (XPS) measurement was carried out with a photoelectron spectrometer (ESCA-750 available from Shimadzu Corporation) with respect to the coated plates obtained in Examples 2 to 5. Integral intensities of F1s and Si2p were corrected with detected sensitiveness, and an atomic ratio of F/Si was calculated.

Excited X-ray: Mg, Kα rays (1253, 6 ev)
X-ray output: 8KV-50 mA
Vacuum degree: 3×10$^{-8}$ Torr
The results are shown in Table 19.

TABLE 19

| | Adding amount of Me51 (part by weight) | Water contact angle (degree) | F/Si |
|---|---|---|---|
| Ex. 5 | 20 | 85 | 4.6 |
| Ex. 4 | 40 | 73 | 1.8 |
| Ex. 3 | 60 | 46 | 0.13 |
| Ex. 2 | 80 | 35 | 0.12 |

As it is clear from Table 19, the F/Si ratio is lowered remarkably with increase of the adding amount of the above-mentioned compound. This means that around the surface of the coating film, there is a very small amount of fluorine-containing resin and on the contrary, an amount of Si is considerably large. Therefore, it can be concluded that there exists a large amount of the above-mentioned compound as an additive rather than as a curing agent for the fluorine-containing resin.

Also the contact angle of water (after a lapse of six months) is lowered extremely with increase of the adding amount of the compound. It is presumed that at least around the surface and further around the outermost surface, water in the air reacts with a SiOCH$_3$ group to change it to a hydrophilic SiOH group and that a reaction with the fluorine-containing resin for curing does not arise.

INDUSTRIAL APPLICABILITY

As it is clear from the above-mentioned results, the non-aqueous composition for paints of the present invention can form a coating film being remarkably excellent in stain-proofing property, and the stain-proofing agent of the present invention can improve stain-proofing property of paints, etc. remarkably.

What is claimed is:
1. A compound represented by the following formula (I):

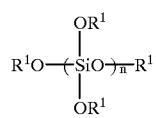

(1)

wherein n is an integer of 2 to 20, all of $R^1$ are different or at least two of $R^1$ are the same, and each of $R^1$ is an alkyl group having fluorine atom, methyl or ethyl, provided that at least one of $R^1$ is an alkyl group having fluorine atom.

2. A compound represented by the following formula (II):

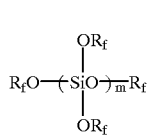

(II)

wherein m is an integer of 4 to 20, all of $R_f$ are different or at least two of $R_f$ are the same, and each of $R_f$ is an alkyl group having fluorine atom.

3. A non-aqueous composition for paints comprising (i) a stain-proofing agent comprising a compound represented by the following formula (1a):

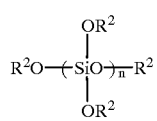

(1a)

wherein n is an integer of 2 to 20, all of $R^2$ are different or at least two of $R^2$ are the same, and each of $R^2$ is an alkyl group having fluorine atom or a monovalent organic group having 1 to 1,000 carbon atoms which may contain oxygen atom, nitrogen atom and/or silicon atom, and at least one of $R^2$ is an alkyl group having fluorine atom; (ii) a resin; and (iii) a curing agent and/or a curing catalyst.

4. A non-aqueous composition for paints comprising (i) 100 parts by weight of a resin; (ii) 60 to 80 parts by weight of a stain-proofing agent comprising a non-fluorine-containing compound represented by the following formula (1b):

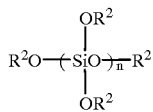 (1a)

wherein n is an integer of 2 to 20, all of $R^2$ are different or at least two of $R^2$ are the same, and each of $R^2$ is an alkyl group having fluorine atom or a monovalent organic group having 1 to 1,000 carbon atoms which may contain oxygen atom, nitrogen atom and/or silicon atom, and at least one of $R^2$ is an alkyl group having fluorine atom; and (ii) a resin.

* * * * *

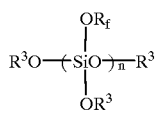 (1b)

wherein n is an integer of 2 to 20, all of $R^3$ are different or at least two of $R^3$ are the same, and each of $R^3$ is a monovalent organic group having 1 to 1,000 carbon atoms which may contain oxygen atom, nitrogen atom and/or silicon atom; and (iii) an appropriate amount of a curing agent and/or a curing catalyst.

5. A non-aqueous composition for paints comprising (i) a stain-proofing agent comprising a compound represented by the following formula (1a):

UNITED STATES PATENT AND TRADEMARK OFFICE
CERTIFICATE OF CORRECTION

PATENT NO.   : 6,075,110
DATED        : June 13, 2000
INVENTOR(S)  : Mohri et al.

It is certified that error appears in the above-identified patent and that said Letters Patent is hereby corrected as shown below:

<u>Column 74,</u>
Line 11, change "(1)" to -- (I) --

<u>Column 75,</u>
Line 5, Formula (1b), change "$OR_f$" to -- $OR^3$ --

Signed and Sealed this

Fifth Day of August, 2003

JAMES E. ROGAN
*Director of the United States Patent and Trademark Office*